(12) United States Patent
Rasetti

(10) Patent No.: US 12,375,458 B2
(45) Date of Patent: Jul. 29, 2025

(54) METHODS AND SYSTEMS FOR HIGHLY SECURE DATA ANALYTIC ENCRYPTION AND DETECTION AND EXTRACTION OF TRUTHFUL CONTENT

(71) Applicant: Mario Rasetti, Turin (IT)

(72) Inventor: Mario Rasetti, Turin (IT)

( * ) Notice: Subject to any disclaimer, the term of this patent is extended or adjusted under 35 U.S.C. 154(b) by 258 days.

(21) Appl. No.: 18/118,862

(22) Filed: Mar. 8, 2023

(65) Prior Publication Data

US 2023/0421542 A1  Dec. 28, 2023

Related U.S. Application Data

(60) Provisional application No. 63/438,421, filed on Jan. 11, 2023, provisional application No. 63/319,198, filed on Mar. 11, 2022.

(51) Int. Cl.
*H04L 9/40* (2022.01)
*G06F 21/60* (2013.01)

(52) U.S. Cl.
CPC ........ *H04L 63/0428* (2013.01); *G06F 21/602* (2013.01)

(58) Field of Classification Search
CPC .............................. H04L 63/0428; G06F 21/602
See application file for complete search history.

(56) References Cited

U.S. PATENT DOCUMENTS

| | | | |
|---|---|---|---|
| 11,972,343 B2 * | 4/2024 | Markram | G06N 3/045 |
| 2007/0005808 A1 * | 1/2007 | Day | H04L 47/12 709/248 |
| 2022/0058022 A1 * | 2/2022 | Fiske | G06F 9/30058 |

* cited by examiner

*Primary Examiner* — Vance M Little
(74) *Attorney, Agent, or Firm* — Braxton Perrone, PLLC; Gregory Perrone; Bobby W. Braxton

(57) ABSTRACT

A method for encryption of a data item and determining the veracity of a data item by defining a set of data as a topological space and generating a collection of topological invariants according to at least one characteristic of the topological space and assigning a shape to the topological space according to the generated collection of topological invariants. The topological space is decomposed according to a set of homology groups and identity data of an authorized owner of the data defined as the topological space is decoupling from the defined topological space according to a data encryption manipulation process performed on the data without decryption of the data. Output is generated according to the recoupling of the identity data of the authorized owner used to recouple the defined topological space according to the data encryption manipulation process.

3 Claims, 3 Drawing Sheets

METHODS AND SYSTEMS FOR HIGHLY SECURE DATA ANALYTIC ENCRYPTION AND DETECTION AND EXTRACTION OF TRUTHFUL CONTENT

This application claims priority to U.S. Provisional Patent Application No. 63/319,198 filed Mar. 11, 2022 and U.S. Provisional Patent Application No. 63/438,421 filed Jan. 11, 2023, the entirety of each being incorporated herein by reference.

FIELD OF THE DISCLOSURE

The field of the disclosure relates to data encryption, and in particular methods and processes entailing the addition of two supplementary steps to any process aimed to privacy-preserving data analytics, meant to return the outcome of a data analytics manipulation over a set of proprietary data to provide the data owner guarantee that the individual who can perform steps in the encryption/decryption procedure is the individual who can read the output. In addition, methods and systems are disclosed for detection and extraction of truthful content from among malicious, deceptive, hoaxes, scams and online misinformation and content. Deceptive application program or robots or "bots" populate techno-social networks. At times these "bots" are relatively benign, but many are created to harm, by tampering with, manipulating, and deceiving social media users, e.g., infiltrating political discourse, manipulating the stock market, stealing personal information, and spreading misinformation.

SUMMARY

Machine Learning (ML) is rather heuristic, meaning that its processes, in particular the construction of ontologies, are very much operator-dependent and even though improvements were devised to make the learning process more effective, such as deep reinforcement, it has at the moment little or no way to approach the questions of self-referentiality and causation. Topological Data Analysis (TDA), and in particular its far reaching version known as Topological Data Field Theory (TDFT), which can be fully unsupervised and help find questions before looking for answers, on the other hand, is difficult computationally. It can, however, be efficiently used in conjunction with deep reinforcement learning with the advantage of having a more rational approach to provide to the analysis a hierarchy of values, as TDA naturally leads to classifying behavior in equivalence classes. ML and TDA (in particular in view of its TDFT version) may be thought of as having a common "physical" reference frame, provided by their implementation in terms of (Artificial) Neural Networks ((A)NN); this is what makes the construction of a more general theoretical framework embedding both viable in terms of Constructor Theory (CT). CT represents fundamental laws of anything based on a physical support in terms of possible versus impossible transformations over that support, as well as of the reasons for such (im)-possibilities. A TDA⊕ML representation in terms of a unifying theory expressed in the language of CT leads to the possibility of facing the intrinsic limits that the Artificial Intelligence (AI) approach might possibly exhibit (decidability of learnability); that is, of representing decision-making processes through what is learnable or not and why.

With TDA's algebraic topology methods, integrated with Hopcroft's idea of treating data sets as spaces (their key property is that these are not vector spaces, but rather topological spaces) whose "shape" is relevant, data analytics underwent a true "change of paradigm", leading to a totally new conceptual framework.

In TDFT the foresight is that appropriate mathematical tools, grounded on the subtle and profound notion of "space of data"—as mentioned, geometrical representation of large data sets as spaces—enables incorporation of data in a geometric or topological setting that allows identification and control of the hidden information patterns in a very effective way.

The process and methods of the present invention are pursuit is first to perform the serial construction of the scheme: <data>→<information>→<knowledge>→ <wisdom>: i) DATA: the method/design of any collection of data is not neutral; ii) INFORMATION: also information can be processed in non-unique nor mutually exclusive ways; however, resorting to the analysis of the shape of data space to extract information as a collection of patterns of data correlations, as TDA does, amends such limitation; iii) KNOWLEDGE: knowledge is nothing but the set of correlation patterns of different pieces of information, and as such it candidates itself as the natural framework for the design of optimal action; iv) WISDOM: comes from the collection of scenarios emerging from the mathematical (algorithmic) models of the system generated by its—virtual yet faithful—knowledge, as reached at step iii) and implies the capacity of making rational, evidence-based decisions accounting for different possible actions.

TDFT is a framework allowing for the very efficient (optimal or sub-optimal) exploration of large amounts of data, because it provides innovative data mining method based on the (non-linear) topological field theory of the space of data, and—being such space topological with its related invariants coding all the information it encodes—actually goes beyond ML but also may improve the efficiency of ML techniques.

The methods of the present invention allow for the inference of information from global rather than local data space features. This stems from integration of deep mathematical aspects of topological analysis of the data space, with formal language theory (grounded on the field theory gauge group) and theoretical computer science. TDA goes beyond the conventional complex networks theory because it replaces the notion of "network"—where all "interactions" are two-body—with that of 'simplicial complex", a n-dimensional hypergraph with a very rich combinatorial structure, where interactions involve in principle arbitrary numbers of vertices, and this overcomes efficiently the limitations of conventional data mining methods such as ML.

Recall that topology is a tool to handle large, high-dimensional, complex spaces of data because: i) Qualitative Information is what is relevant: as discussed, data users aim to obtain eventually knowledge, namely to understand how data is organized on large scale—hence global, though qualitative, information is what matters; and Topology is the branch of mathematics that deals with qualitative rather than quantitative geometric information about a space (connectivity, classification of loops and higher dimensional manifolds, invariants). ii) Metrics are not theoretically justified in data space: in physical sciences, phenomena support theories which instruct exactly what metric to use—in the social sciences this is not the case; and Topology, contrary to plain metric geometry, studies geometric properties in a way insensitive to metrics: it ignores distance function and replaces it with some measurable notion of "connective nearness", i.e. proximity iii) Coordinates are not natural: data is typically conveyed and received in the form of "vector-like" strings of symbols, yet the "components" or linear combinations or norm of these "vectors" are not natural in any sense: the space of data is not a vector space. Properties of data space depending on the choice of coordinates are not relevant; Topology deals instead just with those properties of geometric objects that do not depend on coordinates but only on intrinsic geometric features; it is coordinate-free. Finally, iv) Summaries are what is valuable: "typical" or "characteristic" trends are indeed what provides the information one is looking for. Topology provides an explicit representation of the data space shape, irrespective of to what the data relates. It allows inclusion of the cases when one doesn't know what to look for: the shape, including—and hence suggesting—all possible plausible answers, and therefore the way to determine which are the right questions to ask, consistent with those answers.

As for the latter point, the conventional method of handling data is by a graph (a network W) whose vertex set is the set of all points of data space and two points are connected by an edge if their "proximity measure', in the sense of Grothendieck topology is below some given value, $\varepsilon$; then the optimal choice of $\varepsilon$ is determined. This is, however, too local to extract in a reliable way (namely, such as to be—for example—able to classify) the hidden correlation patterns: it is not sufficient to obtain dependable summaries. As mentioned, Topology instead allows resort to the representation of the space of data by a new object, a simplicial complex, say $\Sigma$. While W is a graph that captures well data local connectivity but ignores a wealth of higher order (global) features, the latter are instead well discerned by its natural completion: the higher-dimensional object of which W is the 1-skeleton; just $\Sigma$. $\Sigma$ is a piece-wise-linear space built out of simple pieces (simplices) identified combinatorially along their faces. The interesting feature referred to above is that this accounts not only for "two-body" interactions (in a network between two nodes there is either one link or nothing), but for arbitrary "n-body" relations (higher dimensional simplices).

The reason of the strength of TDFT is that topological measures and observables are by construction very robust, and that moreover they permit to capture explicitly interactions between more than pairs of agents (the nodes), thus providing a framework to describe complex processes involving several agents, and to quantify and compare the global shape of arbitrary spaces. This is important because virtually all interesting complex systems can be thought of as living in either configuration or phase spaces, including those that can be approximately described using finite datasets, in terms of simplices.

The two main concepts used to achieve this are "persistent homology" and "topological simplification": i.) Persistent Homology (PH) encodes the shape of topological spaces by progressively finer approximations—higher order analogs of links between nodes—in a network able to describe explicitly interactions of more than two agents at the same time. Variation of $\varepsilon$ allows us identification and separation of noise against signal and reduce it. The process emphasizes those topological features in increasing number of dimensions (one-dimensional cycles, closed two-dimensional surfaces surrounding three dimensional cavities, etc.), that survive through the variation sequence, and hence characterize the shape of the dataset, permitting comparison in a principled way of arbitrary spaces with different dimensions, number of points, shape (invariants), etc. In this manner, the shape of correlation spaces among data space regions are detected and characterized, and how such shape may change is determined. Functional, global, and localized homological information can all be used to track the system evolution in time and fingerprint individual subjects. ii.) Topological simplification (known as Mapper, from the name of the most famous algorithm that implements it) is a topological dimensionality reduction scheme, aimed to extract lower-dimensional simplicial-complex backbones from high-dimensional datasets. In this construction the topological information is used to build a topological skeleton (easier to tackle, being of lower dimensionality) able to highlight dissimilarities both in structure and function of different behavioral pathways. The process can be further leveraged to build a "topologically informed" map of feature spaces, thus improving and stream-lining the selection of features important for classifications in such spaces (for example, equivalence classes of correlation patterns).

Topological descriptions, namely characterization of spaces in terms of their topological invariants, are equally functional in understanding and modeling the circuitry of related (A)NN and their capacity to learn specific tasks. Topological method approaches allow NNs to take advantage of homological descriptors to better detect or craft adversarial attacks by exploiting the topology of learned manifolds, and to improve the interpretability of what actually happens inside NNs as they learn to perform complex tasks. This crossover between topology, neuroscience and artificial intelligence occurs as the capacities of neural networks, like those of the human connectome, reside in how they represent data spaces internally; just like brain functions are encoded in functional patterns and this is a well-defined problem of comparison of spaces. Topological invariants provide thus a common thread and a robust tool to understand both cognitive & behavioral processes and Artificial Intelligence (AI) in its physical implementation through neural networks.

Topological invariants are invariant with respect to those transformations of the space of data into itself which preserve the full space topology. This provides another efficient bridge between the topological approach and ML. In the continuum this set of transformations gives rise to a group, the mapping class group. Such group has a discrete analogue, $\mathcal{G}$, in the case in which the reference space is a simplicial complex, and its irreducible representations are algorithmically known, as the group is known in terms of its presentation (generators and relations, all expressible in terms of elementary moves over $\Sigma$). Referring the space of data to the basis defined by such representations, turns the observables of the data set—information, correlations, equivalence classes—to a block-diagonal direct sum expanded form: a feature that, in turn, makes any process of characterization of these observables to algorithmic complexity $\mathbb{P}$, even where it would result $\mathbb{NP}$ in a different representation. This qualifies TDFT as number one ingredient in the program of providing AI with a rigorous mathematical framework capable of dealing with the enormous complexity of human communication and cognition.

Another key facet is Constructor Theory (CT), the modern extension of John von Neumann's far-reaching idea of 'universal constructor', whereby Information Theory (IT) can be formulated completely and solely in terms of which transformations of the ground physical systems may occur and which may not. This is what constructor theory does in general: the basic principle of CT being that "All subsidiary theories are expressible entirely in terms of 'statements' about which physical transformations are «possible» and which are «impossible», and why". For example, the theory of computation embodied in the notion of Turing Machine (TM) regards computers as well as the information they manipulate in purely abstract terms as mathematical objects; CT instead emphasizes that information is physical and that there is no such thing as an abstract computer: only a physical object can compute. Thus CT-IT does not regard information as an a priori mathematical or logical concept, but as something whose nature and properties are determined by the underlying laws of physics alone. A purely constructor-theoretic form of ML, spanning the 'connectome' physical view of neuroscience together with the (A)NN one is available. In it, as for IT, the processes taking place when ML operates are represented in the frame of CT, as they do share a common physical frame: neural networks, both natural and artificial. (A)NNs, brick circuits of AI machines, mimic the human brain connectome based on the concept that one way to think about the rational brain is that it works by accreting smaller abstractions into larger ones.

Machine Learning is the branch of AI concerning the construction and study of systems that can "learn" from data. Its core is the capacity of representing data instances and functions evaluated on these instances in such a way as to allow for recognition and reconstruction of the method the system will perform with on different sets of data instances. Keynote is the algorithm's ability to perform accurately on new, previously unseen examples after having trained on a learning data set. In other words, the core goal of a learner machine is to generalize from its experience. The training results are probability distributions obtained from a reduced scale experience on the training data set, while the learner's task is to extract something more general, so as to produce new, more realistic probability distributions and from these useful predictions in new cases. One can say that ML focuses on the discovery of previously unknown global properties of the dataset. It should be kept in mind, however, that current machine learning systems operate almost exclusively in a model-blind (i.e. purely statistical) mode, not even incorporating very general assumptions, such as a notion of reality, or the capacity of reasoning about retrospection or the outcome of interventions based on causal inference. This entails severe theoretical limits on their power and performance and, above all, their possibility of achieving human level intelligence.

In a broader sense, this technique aims to "learning something useful" about the environment within which the system operates as well as about how the system itself works. How gathered information is processed leads to the development of algorithms reflecting how to process high dimensional data and deal with uncertainty. Thus, whilst not all ML techniques have a natural description in terms of probability theory (usually Bayesian, as causation needs to be implemented), many do, as it was the case for the framework of Graphical Models resulting from the entanglement between graph theory and probability theory, that has enabled the unique efficient understanding and transference of ideas from statistical physics; essentially the notions of correlations, statistics, and entropy.

As discussed, ML is rather heuristic. Assume a set of input-output pairs (the 'training set') $\{\langle i_k^{(in)} | i_k^{(out)} \rangle\}$: the problem of ML consists in guessing first the map $\mathcal{T}: i_k^{(in)} \mapsto i_k^{(out)}$, and then implementing a procedure that leads to describing such problem's guessed solution with a 'model' $\mathfrak{W}$. Typically, $\mathfrak{W}$ is assumed to depend on a set of parameters, $\Theta$ (i.e. one chooses a parametric class of functions). An intermediate step is the definition of a 'loss function' to compare the results of the model with the experimental values and the final one is the 'optimization' of $\Theta$ so as to reduce the loss to minimum. In other words, ML problems are in fact optimization problems. One talks about learning because the solution to the optimization problem is not given in an analytical form; indeed, often there is no closed form solution and one has to resort to iterative techniques (typically, gradient descent) to approximate the result progressively. It is this form of iteration over data that is understood as a way of progressive learning of the objective function based on the experience of past observations.

A final issue, crucial to complete the framework, is "learnability" in ML. The mathematical foundation for ML through CT, whose natural technical language is category theory, improves our understanding and provide us with novel principles and frameworks to design new learning paradigms and procedures. In particular "no go" theorems are crucial. This bears on the fact that also ML cannot escape the effect of Gödel theorem, namely the property that the truth of some true statements is not provable; it is undecidable. For example, Cantor's Continuum Hypothesis (CH) —which states that no set of distinct objects has cardinality larger than that of the integers yet smaller than that of the real numbers—cannot be proved nor refuted using the standard axioms of mathematics. Ben-David and coworkers proved the possible equivalence in certain cases between learnability and compression, ensuing from the feature that the solution to the respective optimization problem may be isomorphic to the proof of CH. In ML learnability may then be undecidable in the sense of Gödel.

In other words, identifying the learnable is a fundamental goal of ML: but to achieve it, one needs a robust framework and method, able to support the formal treatment of learnability. The conventional paradigms of ML fail to do this, as learnability cannot always be decided by standard axioms of mathematics, but redefining such paradigms within the boundaries, rules and constraints of CT∪TDFT allows us to define the conditions for learnability to hold. According to the embodiments of the present invention described herein, steps directed to performance of arbitrary (in the potential applications privacy-preserving) data analytics, as well as a process to detect whether a given message coded in $\mathfrak{D}$ is "true" or "false" or yet "undecidable" are performed.

Leveraging the novel encryption techniques of the present disclosure, novel techniques for detection of the truth of digital content is further described. The presently described truth detection methods comprise generating a set of transformations of the space of data into itself that preserves topology (the 'shape' of the space). The way such set—mathematically, a group—is constructed is through a process of factorization in elementary steps, each of which allows for a specific representation in terms of a general code that is a logical structure. This process generates a language, whose words are strings specifying how such steps are necklaced in paths. This automatically assigns every correlation path connecting any subset of data identified as the "initial" to any specified other one to an equivalence class. Such paths, on the other hand, can be associated to a set of "words" in the group: words in the same equivalence class represent the same logical concept. A path that crosses the boundary between different equivalence classes can do so only at the expense of violating some (at least one, not necessarily all) of the clauses that constrain expressions in the logic.

Security of information is of increasing importance in computer technology. It is critical that data being sent from a sender to a recipient is unable to be intercepted and understood by an intermediate source. In addition, authentication of the source of the message must be ensured along with the verification of and security of the message content. Various cryptographic encoding and decoding methods are available to assist with these security and authentication needs. However, even when data is accessed or revised by one authorized to do so, the problem of ensuring the veracity of the underlying data that has been accessed or revised persists. There is a need, therefore, to perform a layer of security and authentication of data communicated over a communication channel between computers to decipher truthful content versus false, fraudulent or misleading content.

The methods and systems of the present invention build on this encryption process which essentially follows the evolution of a given subset of data—the 'initial fact'—through its story of transformations. Whenever the path describing such collection of transformations from the initial fact to another, given, subset does so by crossing from one equivalence class to another, this is an indication of a violation of the rule of consistency with that logic.

The methods and systems of the present invention detect the truth of digital content, such as a news item, in which case the challenge is constructing the most accurate and complete reference set to construct the logic relations that one considers as generators of the truth. Other possible applications bear on science (checking consistency of certain deductions with the basic principles and assumptions), technology (design of complex physical systems interacting freely but within the boundaries of the assumed objective), derivation of consistent (i.e., non-contradictory) algorithms and cross-check of equivalence of such algorithms when different.

BRIEF DESCRIPTION OF THE DRAWING

For a detailed description of example embodiments, reference will now be made to the accompanying drawings in which.

DETAILED DESCRIPTION

Figure 1:
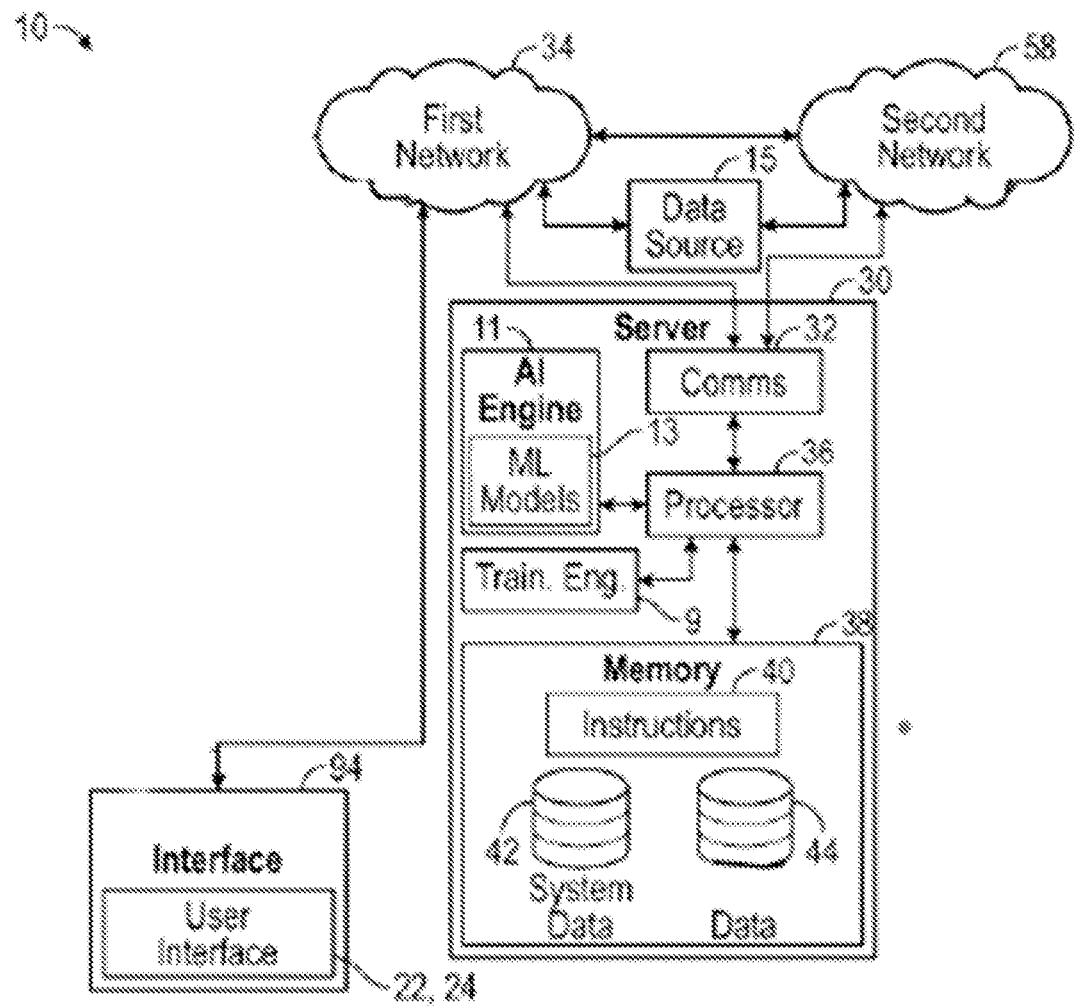
FIG. 1 depicts a block diagram of an embodiment of a computer-implemented system for performing methods for highly secure data analytic encryption and detection and extraction of truthful content, according to an embodiment of the present disclosure.

Before undertaking the detailed description below, it may be advantageous to set forth definitions of certain words and phrases used in connection to the disclosed exemplary embodiments: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the subject matter of this application has been described with reference to illustrative embodiments, this description is not intended to be construed in a limiting sense. Various modifications and combinations of the illustrative embodiments as well as other embodiments will be apparent to persons skilled in the art upon reference to the description. It is, therefore, intended that the appended claims encompass any such modifications or embodiments. This general processes described herein may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment methods and systems described herein is anticipated by the overall scope of the presently disclosed methods and systems.

Methods and Systems for Highly Secure Data Analytic Encryption

The present invention relates to adoption of a first standard (and commercial) homomorphic encryption to perform a specific task on its encrypted data—that can be done without first decrypting it—that is: decouple from the data set under consideration all 'proprietary' information data and replace it with a selected (arbitrary and known) correlation pattern—embodied into the homomorphic encryption scheme. The operator is the only one in possession of this ingredient. Successive to the application of the characteristic uniquely defined transformation realized in accordance with the present encryption method, the data thus treated can be processed to the desired objective. Then application first of the inverse transformation defined to the outcome of the data processing, and successive further decryption by the inverse homomorphic encryption recouples proprietary information to the results, as if all the operations had been performed on the unencrypted data.

In other words, the application of presently described method turns its input data set into a form which preserves, encoded, all the information one is looking for and yet it is undecipherable (even using topological methods, as its topology is not that of the original data set) by any operator who doesn't possess two crucial ingredients: the correlation pattern used for homomorphic encryption, and the set of parameters specifying the specific topological data space transformation performed with the method according to an embodiment of the present invention herein disclosed.

With the rise of the internet, information security plays a more and more important role in the present era. In the classical cryptography, majority of cryptography algorithms enhance the security of information through relying on mathematical problems that are difficult to solve. However, the development of quantum computing poses a threat to these cryptographic algorithms based on mathematical complexity. For example, RSA, a famous classical public key mechanism, improves the security of algorithms by using the property that a large integer is hard to be factorized. However, it has been found that the quantum search algorithm Shor's can calculate the factorization of large numbers in polynomial time, that is, the classical Non-deterministic Polynomial (NP) problem is transformed into the quantum P problem, which could be a nonnegligible threat to the RSA algorithm. Therefore, in order to keep the network information security, researchers pay much attention on post-quantum algorithms to resist the attacks from the powerful quantum computing on the classical cryptographic algorithm. Artificial neural network (ANN) with the characteristics of multiple structures and unoriented property is widely researched in recent decades. Combing ANN with cryptography can form different types of cryptosystems.

The methods described herein and the embodiments thereof are embodied in application programs that function to perform a layer of processing unique to communication over networked processing devices and cloud computing, that is, a technological advance in the communication of secure and encrypted data. The inventive methods described herein are technological improvements to data processing systems and methods of secure communication and delivery of data by transforming an input data set into undecipherable form which is preserved in encoded form, unless the correlation pattern used for homomorphic encryption, and the set of parameters specifying the specific topological data space transformation performed according to an embodiment of the present invention herein disclosed, are known. The methods of the present invention are a methodology to extract the truthful or accurate content from malicious, deceptive, online misinformation and content, or scams and hoaxes, with the final aim of cracking the surreptitious influence of truth falsifying information delivered over accessible communication systems, such as the web system. Deceptive bots populate techno-social networks: they are sometimes benign, but many are created to harm, by tampering with, manipulating, and deceiving social media users, e.g., infiltrating political discourse, manipulating the stock market, stealing personal information, and spreading misinformation.

The procedure proposed allows therefore for data processing of any data set in which some subset is constrained to remain hidden, in such a way that the outcome of the data processing remains unchanged, as if it had been applied to the entire set. Of course, privacy-preserving is the most common (and looked for) situation of this sort, but obviously not the only one (e.g., other—easily imaginable—ones are: hiding classified information in communications, protecting industrial secrets, comparing outcomes of correlated scientific experiments, etc.). Summarizing, for sensitive data the encryption process described can be used to enable services—such as predictive analytics, data mining for information or 'knowledge' (i.e., correlated information), or simply sensitive data storage—by removing all barriers inhibiting data sharing, and thus increasing security, manipulating data in the same way as if dealing with the entire data set.

According to the embodiments herein described, a secure and efficient method for encryption of data is described, comprising the steps of defining a set of data as a topological space; generating a collection of topological invariants according to at least one characteristic of the topological space; assigning a notion of shape to the topological space according to the generated collection of topological invariants; decomposing the topological space into subcomponents according to a set of relevant homology groups (identified by the data set shape itself). This is used to decouple from the defined topological space identity data of an authorized owner of the data defined as the topological space according to a data encryption manipulation process performed on the data without decryption of the data; and to generate an output according to the recoupling of the identity data of the authorized owner used to recouple the defined topological space according the data encryption manipulation process, wherein the recoupling the topological space requires recoupling of the decoupled identify date according to a recoupling procedure performed by the authorized owner.

In one embodiment of the presently described high security data encryption method, the space of data $\mathcal{D}$ is a topological space, not a vector space: it has no metrics, no inner product, and no "components". As such the topological space is endowed with a (Grothendieck) notion of 'nearness', hence it has a simplicial complex representation as data are discrete, and characteristic topological invariants to any order up to the maximum allowed by the size of the data set. The 'shape' of $\mathcal{D}$—generated by the collection of topological invariants—encodes the information ($\equiv$ all patterns of (causal) relations) contained in $\mathcal{D}$.

Being $\mathcal{D}$ a topological space, its structure is fully defined by topology: the branch of non-metric geometry that studies the properties of its objects which remain invariant under arbitrary smooth (no cut or punching hole permitted) deformations. If the space of data $\mathcal{D}$ is submitted to transformations (maps of $\mathcal{D}$ onto itself) which preserve topological invariants, information is preserved. The set of all such transformations has the structure of a group, $\mathcal{G}$.

This entire scheme can be implemented in simplicial form; in which case $\mathcal{G}$ is finite, finitely presented, and discrete. According to the embodiments of the present invention, the outcome of a data analytics manipulation over a (large) set of proprietary data is such that only the data owner—enabled to perform its specific steps in the encryption/decryption procedure—can read the output with the right attribution of ownership.

Input data, assumed to be homogenous, require a preparation process, summarized in the following way:

$\Delta \equiv$ [Raw Data] $\mapsto$ [Simplicial Complex] $\mapsto$ {Persistent Homology Analysis} $\mapsto$ (Persistent 'proximity' Parameter $\mathcal{G}$) $\mapsto$ [Working Data] $\equiv \Delta_{in}^{(PH)}$.

Out of $\Delta_{in}^{(PH)}$ in standard way one constructs the entire relevant invariant homology scheme. Typically, the space of data $\mathcal{D}$ is orientable, as such it can be thought of as homotopic to an appropriate CW complex. The steps leading from [Raw Data] to [Working Data] are characteristic of TDA.

A typical data manipulation scheme in the present invention is represented as $$\Delta_{in}^{(PH)} \xrightarrow{\hbar} \Delta^{(t)} \xrightarrow{\phi} \Delta^{(m)},$$

where $\hbar$ is a generic Fully Homeomorphic Encryption process (FHE) (commercially available in this specific sense and function); $\phi \in \text{Homeo}(\mathcal{D})$ is an operation of the group of transformations of data space $\mathcal{D}$ into itself that preserve topology; $\Delta^{(t)} = \hbar(\Delta_{in}^{(PH)})$ is the conventionally encrypted working data set; $\Delta^{(m)} = \phi(\Delta^{(t)})$ is the set of data on which the data analytics manipulation, $\mathcal{A}^{(\mathcal{A})}$, is performed. FHE is a form of encryption that allows us to perform manipulations on its encrypted data without first decrypting it.

Let $\mathcal{A}^{(\mathcal{A})}(\Delta^{(m)}) \equiv \Delta^{(o)}$, $\mathcal{A}^{(\mathcal{A})}(\Delta)$ being the process of: extraction of information (correlation/causation patterns in the data set), followed by extraction of knowledge (correlation/causation patterns in the information set) implemented by data analytics. The global outcome of the process under consideration is then:

$$\Delta_{out}^{(PH)} = \hbar^{-1}(\phi^{-1}(\Delta^{(o)}))$$

The main task is constructing a set $\hbar^{-1}$ containing one representative element of the group actions for each of the equivalence classes that $\mathfrak{S} \sim \text{Homeo}(\mathcal{D})$ implies. This requires computing the simplicial homology module with coefficients in $\mathcal{G}$ of $\mathcal{D}$, which is standard, as a procedure for computing the simplicial homology module with coefficients in $\mathbb{Z}$ of a space $\mathbb{Z}$ is available, based on single-step recursive homology preserving reduction of the size of the associated chain complex. The process' outcome is the explicit matrix representation of the homology generators $\{\Gamma_j^{(m)}|0 \leq n \leq N; j \in \mathbb{N}\}$ for all $H_n$'s. Here, typically, $0 \leq j \leq J$, where $J \leq \mathcal{N}_c$, $\mathcal{N}_c$ being the number of n-cells in $\mathcal{D}$ considered as a CW complex.

The main task is accomplished resorting to two basic steps: (1) Factorization: decompose $\mathcal{D}$ in elementary components as generated by the set of relevant homology groups $\{H_n|n=1, \ldots, N\}$ of $\mathcal{D}$ as emerged by the 'persistent homology' analysis. The construction is straightforward for $N \leq 3$; it is more complex—and in specific cases might pose problems in terms of algorithmic complexity—for $N \geq 4$, in which case one should resort to homotopy rather than homology analysis, certainly more demanding. It is an empirically checked fact that in a very large number of data set examined over the years, data coming from a great variety of domains, $N \geq 4$ was never found. (2) Orbifold: identify such components with the foliation of all possible local coverings of $\mathcal{D}$ with orbits generated by the local symmetry group. Use local GL(n) algebra for composition operations.

Since FHE $\hbar$—assumed to decouple the name of the owner from data in standard way—and the construction of $\mathfrak{S}$ do not commute, and $\phi$ is any word (string of the generators, possibly with repetitions) in Homeo($\mathcal{D}$), the output $\Delta_{out}^{(PH)}$, final outcome of the data manipulation with the proprietors' names reattached, is accessible only to the data owner herself in an absolutely secure way. Indeed, the owner selects, case by case, the (recursive) operation $\phi$, and the encryption $\hbar$ (possibly outsourced).

Information accuracy depends on the maximum homological dimension $n_{max}$: the dimension at which persistent homology analysis allows us to stop. Knowledge completeness and accuracy depend only on homological dimension $N \approx n_{max}$.

The process described to obtain $\Delta_{out}^{(PH)} = \hbar^{-1}(\phi^{-1}(\Delta^{(o)}))$ out of the input data set $\Delta$, as well as a procedure (eventually an algorithm) to construct the generators of Homeo ($\mathcal{D}$) in terms of the generators $\{\Gamma_j^{(n)}\}$ of $\mathcal{H}$ is described in detail below. According to an embodiment of the presently described encryption process, every smooth manifold $\mathcal{M}$ admits a Whitehead compatible triangulation, thus one can always regard $\mathcal{M}$ as endowed with an underlying piecewise linear (PL) manifold $\mathfrak{P}(\mathcal{M})$. $\mathfrak{P}(\mathcal{M})$ is unique up to PL-homeomorphism, i.e., every diffeomorphism of $\mathcal{M}$ determines a PL-homeomorphism of $\mathfrak{P}(\mathcal{M})$, and a smooth isotopy of isomorphisms of $\mathcal{M}$ determines a PL-isotopy of $\mathfrak{P}(\mathcal{M})$. In other words, there is a classifying space for smooth manifolds which maps to a specific classifying space for PL-manifolds (this is the reason why one can talk of Discrete Isotopy and Discrete Mapping Class Group, $\mathcal{G}$).

The homology and homotopy groups of classifying spaces of the group of diffeomorphisms are finitely generated at every and each degree (except in singular dimensions), and so are those for the PL case. A formal prescription follows for computing the simplicial homology module with coefficients in $\mathbb{Z}$ of a space X, which is based on one step-recursive homology preserving reduction of the size of the associated chain complex. The process comprises the step of reducing the matrix of the boundary operator in each dimension p, to its Smith Normal Form relative to the appropriate bases. This has a clear and intuitive geometric interpretation, as its tools for each p are—chosen as natural basis for the group of p-chains of the chain complex $K^p$, the basis consisting of all the p-simplices—the p-incidence matrices $E_{p+1}$. $E_{p+1}$ represents the homomorphism $\partial_{p+1}$ connecting the canonical bases $K^p$ (rows) and $K^{p+1}$ (columns). By construction each column in $E_{p+1}$ is the boundary of a single (p+1)-simplex, decomposed in the base of p-simplices.

The Mayer-Vietoris sequence, which relates the homology of a topological space to the homologies of its subspaces, is applied to selected sub-components of the input space and their intersections. This approach is very efficient when applied in the context of persistent homology: each subspace $X_j$ has a k-th homology group $H_k(X_j)$, a vector space whose dimension—the Betti number $b_k(X_j)$—counts the number of topological attributes in dimension k. Filtration, viewed as a progressive growing of space, shows topological attributes appear and disappear, and tracking an attribute through filtration is what persistent homology does.

According to the presently described encryption process, an ordering procedure ensues, for each subspace: first, order the rows of the incidence matrix by increasing pivot, so that the matrix is set in hierarchical form with as many pivots as possible set at 1; then reduce all rows according to their g.c.d. setting the matrix in an echelon (triangular) form; next, compute the submatrix determinant $\mathcal{D}$, product of the invariant factors, and perform all further operations mod $2\mathcal{D}$, as it is known that mod-computation with this modulo preserves all homology information. The outcome is both the full characterization of the relevant "shape" of the data space, and the generators of its homology. Once the homology generators are obtained, the process continues with the construction of the generators of Homeo (X) (or of the subspaces in which X can be decomposed).

The group Homeo ($\mathcal{M}$) acts as well on the product manifold $\mathcal{M} \times \mathcal{W}$ for any manifold $\mathcal{W}$. Thus, it also has a natural action on $\text{Conf}_k(\mathcal{M}) = (\mathcal{M}^{\times k} - \Delta)/\text{Sym}_n$, where $\mathcal{M}^{\times k} = \mathcal{M} \times \ldots \times \mathcal{M}$, k times, $\Delta$ is the topological subspace of n-tuples of points for which at least one pair of components coincide, the "configuration space" of k distinct, unlabeled points in $\mathcal{M}$. When $\pi_1(\mathcal{M})$ has trivial center, the action of Homeo on $\mathcal{M}$ lifts to an action on the covers of $\mathcal{M}$. Each orbit is the continuous, injective image of a cover of configuration space $\text{Conf}_k(\mathcal{M})$.

If $\mathcal{M}$ and $\mathcal{N}$ are connected manifolds with dim($\mathcal{M}$)<2 dim($\mathcal{M}$) and Homeo$_c(\mathcal{M})$ acts on $\mathcal{N}$ without global fixed points, then $\mathcal{N}$ has the structure of a generalized flat bundle over $\mathcal{M}$, i.e., there is a homology manifold $\mathcal{F}$ such that $\mathcal{N} \cong (\tilde{\mathcal{M}} \times \mathcal{F}/\pi_1(\mathcal{M}))$, where $\pi_1(\mathcal{M})$ acts diagonally by deck transformations on $\tilde{\mathcal{M}}$ and on $\mathcal{F}$ by some representation to Homeo ($\mathcal{F}$).

Two problems in topology are known to be algorithmically unsolvable: i) the homeomorphism problem for 4-manifolds; ii) the problem of recognizing $S^n$, $n \geq 5$, up to homeomorphism. The undecidability in both cases basically boils down to the undecidability of the group isomorphism problem. Both these problems become decidable if one restricts one's attention to simply-connected PL-manifolds. Assuming that all simplicial complexes considered are finite, given two (abstract) simplicial complexes, K, L, it is semi-decidable whether their geometric realizations, |K|, |L|, are homeomorphic, i.e., whether there is a computer program that, given K, L, eventually terminates if $|K| \cong |L|$, and never terminates if $|K| \not\cong |L|$.

On the other hand, if $\phi:|K|\to|L|$ is continuous map, then there are subdivisions $\tilde{K}$, $\tilde{L}$ of K, L respectively, and a simplicial map $\tilde{\phi}: \tilde{K}\to\tilde{L}$ such that $\tilde{\phi}$ is homotopic to $\phi$. It follows that homotopy equivalence as well is semi-decidable.

If K is a simplicial complex homeomorphic to space X and G acts on X as a group of homeomorphisms, then one can construct a simplicial complex homeomorphic to X/G. For p the projection map $|K|\to|K|/G$, and s: $|K|\to|K/G|$ the map induced from action of G on simplicial complex $|K|$, the ensuing map $\psi: |K|/G\to|K/G|$ is a homeomorphism if and only if the action of G on $|K|$ satisfies the conditions: a) the vertices of a 1-simplex of K never lie in the same orbit; b) if the sets of vertices $\{v_0, \ldots, v_k, a\}$ and $\{v_0, \ldots, v_k, b\}$ span simplexes of K, and a, b lie in the same orbit; then there exists $g\in G$ such that $g(v_j)=v_j$ for $0\le j\le k$, and $g(a)=b$.

A topological group G is said to act as a group of homeomorphisms on a space X if each group element induces a homeomorphism of the space in such a way that:
  (a) $h\cdot g(x)=h(g(x))$, $\forall g$, $h\in G$, $\forall x\in X$.
  (b) $e(x)=x$, $\forall x\in X$, where e is the identity element of G.
  (c) the function $G\times X\mapsto X$ defined by $(g,x)\mapsto g(x)$ is continuous.

If a group G acts properly discontinuously on a topological space X then the group action must be free.

The action of a group on a simplicial complex can then be introduced, in this way: Using the projection p: $|K|\to|K|/G$, one defines a pair of sets $\mathcal{O}$, $\mathcal{S}$: the elements of $\mathcal{O}$ are the orbits of the vertices of K, and a subset $\{u_0, \ldots, u_k\}$ of $\mathcal{O}$ lies in $\mathcal{S}$ if there exist vertices $\{v_0, \ldots, v_k\}$ of K which span a simplex of K and satisfy $p(v_j)=u_j$ for $0\le j\le k$. Realizing $\mathcal{O}$, $\mathcal{S}$ in some specific vector space produces the complex K/G; p sends vertices of K to vertices of K/G. If $\{v_0, \ldots, v_k\}$ span a simplex of K, then $\{\{p(v_0)\}, \ldots, \{p(v_k)\}\}$ also span a simplex. So p determines a simplicial map s: $|K|\to|K/G|$, and $\forall x\in|K|$, $g\in G$ one has $sg(x)=s(x)$, i.e., s induces indeed a function $\psi: |K|/G\to|K/G|$.

Next, for X a topological space, and fix integer $n\ge 0$, an n-dimensional orbifold chart on X is given by a connected open subset $\tilde{U}\subset \mathbb{R}^n$, a finite group $\Gamma$ of smooth diffeomorphisms of $\tilde{U}$, and a map $\varphi: \tilde{U}\to X$ such that $\varphi$ is $\Gamma$-invariant and induces a homeomorphism of $\tilde{U}/\Gamma$ onto an open subset $U\in X$. An embedding $\lambda: (\tilde{U}, \Gamma, \varphi)\to(\tilde{V}, \Delta, \psi)$ between two such charts is a smooth embedding $\lambda: \tilde{U}\to\tilde{V}$ with $\psi\cdot\lambda=\varphi$. Then there exists a homomorphism $\alpha: \Gamma\to\Delta$ such that the mapping $\lambda$ is $\alpha$-equivariant.

An orbifold atlas on X is a family $\mathcal{U}=\{(\tilde{U}, \Gamma, \varphi)\}$ of such charts, which cover X and are locally compatible: given any two charts $(\tilde{U}, \Gamma, \varphi)$ for $\mathcal{U}=\varphi(\tilde{U})$ and $(\tilde{V}, \Delta, \psi)$ for $\mathcal{V}=\psi(\tilde{V})\subset X$ and a point $x\in \mathcal{U}\cap\mathcal{V}$, there exists an open neighborhood $\mathcal{W}\subset \mathcal{U}\cap\mathcal{V}$ of x and a chart $(\tilde{W}, \Lambda, \tau)$ for $\mathcal{W}=\tau(\tilde{W})\subset X$ such that there exist two embeddings $(\tilde{W}, \Lambda, \tau)\to(\tilde{U}, \Gamma, \varphi)$ and $(\tilde{W}, \Lambda, \tau)\to(\tilde{V}, \Delta, \psi)$. An atlas $\mathcal{U}$ is said to refine another atlas $\mathcal{V}$ if for every chart in $\mathcal{U}$ there is an embedding into some chart of $\mathcal{V}$. Two orbifold atlases are said to be equivalent if they have a common refinement. A 'faithful' orbifold X of dimension n is a (paracompact) Hausdorff space X equipped with an equivalence class $[\mathcal{U}]$ of n-dimensional orbifold atlases.

For $\mathfrak{M}=(X, \mathcal{U})$ an orbifo, there exists always a triangulation $\mathcal{T}$ of $\mathfrak{M}$. Assuming that $\mathcal{U}$ consists locally of linear charts—i.e., if for each point $x\in X$, one selects a linear chart $(\mathbb{R}^n, G, \varphi)$ around x, with G a finite subgroup of the orthogonal group $O(n; \mathbb{R})$, for $\tilde{x}$ the point with $\varphi(\tilde{x})=x$, and $G_{\tilde{x}}=\{g\in G|g\cdot\tilde{x}=\tilde{x}\}$ the isotropy subgroup at $\tilde{x}$, up to conjugation $G_x$ is a well-defined subgroup of $O(n; \mathbb{R})$; then space X carries a natural stratification whose strata are the connected components of the sets $\mathfrak{S}_H(X)\approx\{x\in X|(H)=(G_x)\}$, where H is any finite subgroup of $O(n; \mathbb{R})$ and (H) is its conjugacy class— $\mathcal{T}$ can be rendered subordinate to the natural stratification of $\mathfrak{M}$, namely such that the closure of every stratum of $\mathfrak{M}$ is a subcomplex of $\mathcal{T}$. Then the relative interior of each simplex of $\mathcal{T}$ is contained in a single stratum of $\mathfrak{M}$.

By replacing $\mathcal{T}$ by a central subdivision, the cover of closed simplices in $\mathcal{T}$ refines the cover of X induced by the atlas $\mathcal{U}$. For a simplex $\sigma$ in such a triangulation, the isotropy groups of all interior points of $\sigma$ are the same, subgroups of the isotropy groups of the boundary points of $\sigma$. By further refining $\mathcal{T}$, since for any simplex $\sigma$ in $\mathcal{T}$ there is one face $\mathcal{T}$ of $\sigma$ such that the local group is constant on $\sigma\setminus\mathcal{T}$, one may possibly get a larger group on $\tau$. A triangulation $\mathcal{T}$ with this property is 'adapted' to $\mathcal{U}$, as required in the definition of stratified simplicial homology of an orbifold. $\mathcal{T}$ is an adapted triangulation of X. This is the simplicial analog of an orbifold.

For an orbifold $\mathfrak{M}$ and its corresponding (i.e., having the same sheaves) groupoid (namely, a group with a partial function $f$ from a space X to space Y which is a function from a subset S of X to Y replacing binary operation) G, the fundamental group is isomorphic to the Grothendieck fundamental group of sheaves locally constant on $\mathfrak{M}$ M. An action of a group G on a topological space X is a homomorphism $\phi: G\to\text{Homeo}(X)$: each $g\in G$ is associated with (or represented by) a homeomorphism $\phi(g)\in\text{Homeo}(X)$. Such an action on X partitions X into G-orbits. By defining the quotient topology on these G-orbits, we get a quotient space on X, the quotient space X/G of the G-action. A G-action on X is a covering action if (X; X→X/G) is a covering space. In other words, orbifolds are objects which model spaces that locally arise as quotients of smooth manifolds under smooth group actions. Special cases are global quotient orbifolds X/G of a smooth manifold X under a smooth action of a compact group G.

The notion of Orbifold is geometric and generalizes essentially the definition of manifold by endowing the local charts with a finite group action. The partition $\mathfrak{F}$ of X into immersed submanifolds (subcomplexes in the triangulated case) generated by the orbifold construction is a foliation, of which the submanifold are the leaves.

For any orbifold $\mathfrak{O}=(X, \mathcal{U})$, there exists an adapted triangulation. Any simplex $\sigma$ in a triangulation $\mathcal{T}$ adapted to $\mathfrak{O}$ will have a vertex $v\in\sigma$ with maximal local group, i.e., $G_x\subseteq G_v$, $\forall x\in\sigma$, and $|G_v|\ge|G_x|$. We denote this $|G_v|$ by $w(\sigma)=\max\{|G_x||x\in\sigma\}$ and call it the weight of $\sigma$ determined by $\mathfrak{O}$. In the definition of the related stratified simplicial homology, to complete the construction, on $\mathfrak{O}$ one should think of divisibly-weighted simplices, not arbitrary simplices, as building blocks of the orbifold. Resorting to the simplicial orbifold representation makes all the algorithms for the construction of both the sets of generators of the homology groups $\{H_n|n\in\mathbb{N}\}$, say $\{\Gamma_j^{(n)}|n\in\mathbb{N}; j\in\mathbb{N}, j\ge 1\}$, $n\le n_{max}$, and of the related generators of Homeo $(X_\ell)$, $\ell$ labeling the strata of the orbifold, $X=\cup_\ell X_\ell$, which are expressed in the basis of $\Gamma_j^{(n)}$ with integer coefficients, a polynomial algorithmic complexity endeavor.

Method and System for Detection and Extraction of Truthful Content

The methods described herein and the embodiments thereof are embodied in application programs that function to perform a layer of authentication of data by extraction of accurate or truthful content from false, misleading or deceptive content. The application programs or software that embody the instructions to perform the truthfulness evaluations described herein and the extraction process are specifically tailored to address a problem unique to communication over networked processing devices of otherwise secure and encrypted data, among various networks and created and processed via cloud computing. The inventive methods described herein are technological improvements to data processing systems and methods of communication and delivery of data in the form of multimedia content over wide area networks and employing cloud computing.

The methods of the present invention are a methodology to extract the truthful or accurate content from malicious, deceptive, online misinformation and content, or scams and hoaxes, with the final aim of cracking the surreptitious influence of truth falsifying information delivered over accessible communication systems, such as the web system. Deceptive bots populate techno-social networks: they are sometimes benign, but many are created to harm, by tampering with, manipulating, and deceiving social media users, e.g., infiltrating political discourse, manipulating the stock market, stealing personal information, and spreading misinformation.

More and more and unprecedentedly humans are subjected to being vulnerable to manipulation by digital misinformation, due to a complex set of social, cognitive, economic and algorithmic biases. The network structure does not have uniform density, but it typically exhibits clots immersed in a diluted background: the interior of a clot has such a high density that any misinformation spreads almost instantaneously inside the group it corresponds to, yet clots are so segregated (diluted) that information from the rest of the web does not reach them easily. Inside the bubble, one is selectively exposed to information aligned with the group beliefs. These, in turn, are strengthened and enforced in a setting which is essentially self-referential: an ideal scenario to maximize engagement, but a detrimental one for developing healthy skepticism and dependable knowledge.

Existing search engines designed for this purpose are based on a single feature: the capacity of comparing—through a set of keywords and the adoption of a large-scale machine learning search algorithm consistent with the structure of a given news hypertext, designed to crawl efficiently the Web—fake news and true news. These methods exhibit a conspicuous weakness: the Manichaean distinction of "true" and "fake" depends mostly on which sources are considered a priori reliable and not on the objective truthfulness of the text.

Since one cannot obviously pay attention to the totality of posts in the set of all available feeds, typically the first steps algorithms perform is to determine what to look at and what not to. Unfortunately, the algorithms used by social media platforms are designed so as to prioritize posts that users are most likely to click on, react to and share. However, measurements reveal that intentionally misleading pages get at least as much online sharing and reaction as real news, and such well-meant algorithmic bias toward engagement over truth has the effect of reinforcing social and cognitive biases. This is due to the feature that when the links one follows are shared on social media, the followers tend to visit a smaller and smaller, more homogeneous set of sources (the inside of a clot) than when they conduct a search and visit the top results.

In a very wide class of behaviors, the components of a complex system of concurrently executing agents interact with each other to achieve some global effect. On a "macro" scale, this description fits well today's distributed transactions across the Internet; but on a "micro" scale, it is equally valid only for what bears on how functional computations are ultimately realized. All computations can be resolved into the interactions of large numbers of simple agents: the complex behavior of the overall system is an "emergent property" of these interactions. Good models of computation must take interaction as their basic ingredient yet combine sufficient expressive power to yield faithful descriptions of information, with sufficient mathematical structure and tractability to provide a basis for the formal analysis. At present there is no adequate theory of processes, interaction, information flow etc. available on which the necessary higher order models can be built.

Traditional forms of game semantics in logic—where a system is seen as interacting with its environment by playing a game with it and computational processes are modeled as sequential strategies for playing such games—are interesting because a play of the game can be formalized as a sequence of moves. Thus, logic gives us the tools to understand the whole mathematical structure of wide categories of games bearing on compositionality and syntax-independence, which are key to the analysis of interaction. The crucial feature is here the existence of a global schedule that determines the ground to implement a game strategy: in each position, it is one player's turn to move. Such sequential format has, however, severe limitative consequences: i) there is a modeling limitation, as sequential games can be used to model sequential computation but do not yield models of parallel computation in a natural way; ii) there is a mathematical limitation: despite the evident inherent dual symmetry in games (interchange the roles of the two players), sequentiality is an obstacle to modeling the logic consistently. Thus, sequential games yield indeed satisfactory models only of fragments of Linear Logic.

One needs a "true concurrency" version of games in which global positioning is controlled or possibly even abandoned: only local decisions are still positioned, in the sense that they are for one player or the other, but globally the players act in a distributed, asynchronous fashion. At any given time, however, both may be active in different parts of the "game board". Concurrent games are a generalization of the usual sequential games, yet such generalization and apparent complication can be formalized in a simple and robust way within the frame of time dependent Fourier transform (TDFT). When the process takes place over a symmetric space, invariant manifold of a group, the latter can be generalized to harmonic analysis. Compact closed categories—which are the main structural ingredient of data field representation—indeed allow then reconstruction of grammar and reasoning about lexical meanings of words. This happens, for example, in pre-group grammars that formalize grammars of natural languages, and can be adapted to distributional models of meaning, to formalize meanings of words regardless of their grammatical roles and via the context of their occurrence. The ensuing models consist of spaces (symmetric for the group of homeomorphisms) spanned by a basis consisting of sets of context words and whose elements represent meanings of target words. It is crucial not to lose the truly relevant features, which are encoded in the topology of spaces that are not vector spaces: the problem is once more embedding/comparing spaces to one another.

Distributional models can be applied to a variety of language tasks, such as automatic word-synonymy detection. Unfortunately, available distributional models do not scale to meanings of phrases and sentences. The combination of the two models based on a cartesian product of the pre-group category and the category of finite dimensional spaces equipped with Frobenius product provides only partial solutions to the problem of explicit construction of linear maps for predicative words with complex types: only in a limited number of instances this allows to compare meanings of phrases and sentences with different structures. The domain of application of the model is limited to performing only certain complex tasks: disambiguation, comparison of meanings of transitive and intransitive sentences, and definition/classification tasks.

The concept of self-reference invokes difficult questions, as we encounter notions such as wholes and parts, pointers and indications, feedback, recursion, distinctions, local-global, circulation, self-similarity, invariance, paradox. However, quite analogous notions enter topology: knots and weaves, recursive and fractal forms; a whole array of fundamental ideas all related to the central concept of self-reference. In the presence of self-reference, the most important step implies distinction. The self appears, together with an indication of that self that can be seen as separate from the self. Any distinction involves the self-reference of the one who "distinguishes". There follows that the ideas of self-reference and distinction are inseparably entangled, namely conceptually identical. In one embodiment, operating on a (large) set of raw homogeneous data, which are assumed to encode a specific piece of information referred to as a Message, $\mu$, a process $\wp$ is made available whose outcome is a statement on whether $\mu$ is 'true' or 'false' or yet 'undecidable'.

The logical framework for reasoning about knowledge and evidence, objective of this process, is assumed to be itself uncertain about how to interpret evidence. This is done by representing evidential states not as fixed subsets of the state space, but allowing for the set of possible pieces of evidence to which they may correspond vary over diverse choices belonging to a specific equivalence class, and therefore be itself the subject of uncertainty. Such structure is nothing but a natural generalization of the notion of topological spaces in the sense of Grothendieck.

A faithful, robust, complete axiomatization of the corresponding tri-modal logic of knowledge and evidence entailment exists, extended to include: i) the belief modality and its interaction with evidence interpretation and entailment, ii) the "knowability" modality implemented by an interior operator.

In the frame of doxastic logic, namely a logic reasoning about beliefs, reasoning resorting to a topological semantics for evidence, evidence-based belief, knowledge, learning, generalizes evidence models for belief-centered epistemic. Such logic is complete, decidable and allows for a finite model. The structure of topological subset spaces is what allows for a natural distinction between what is known and what is knowable, provided one resorts to a tri-modal logic of knowledge, knowability, and belief.

Topological subset spaces, in which belief is definable in terms of knowledge and knowability, is what provides the natural tool to interpret the space of data as a (compact) orbifold and define a specific homology theory for compact orbifolds: the stratified simplicial homology, associated with the specific (accepted) triangulations. The orders of the local groups of the points of the orbifold are encoded in the boundary map, hence the theory naturally captures the necessary structural information of the orbifold.

Stratified simplicial homology is invariant under homotopy equivalences that preserve the orders of local groups in all strata. In this perspective, the free part of the homology coincides with the customary simplicial homology of the orbifold and its singular sets. It is then the torsion part that encodes new information. In general, torsion depends in nonlinear way on the local groups of the singular points, and fully bears on the correlation of the singular points in the orbifold.

To recap, recall the Methods and Systems for Highly Secure Data Analytic Encryption described above, where any set of data is considered as a space, the space of data $\mathcal{D}$. $\mathcal{D}$ is a topological space, not a vector space: no metrics, no inner product, no 'component'. However, it is endowed with a (Grothendieck) notion of 'proximity', hence it has a natural simplicial complex representation as data are discrete, and characteristic topological invariants to any order up to the maximum allowed by the size of the data set.

The collection of topological invariants provides a full characterization of the 'shape' of $\mathcal{D}$, which encodes the information ($\equiv$ all patterns of relations, mathematically described by 'correlations') contained in $\mathcal{D}$. Being $\mathcal{D}$ a topological space we study its geometric structure with topology: the branch of non-metric geometry that studies those of its properties which remain invariant under arbitrary smooth (no cut or punching hole permitted) deformations.

If the space of data $\mathcal{D}$ is submitted to transformations $\phi: \mathcal{D} \mapsto \mathcal{D}$ (maps of $\mathcal{D}$ onto itself) which preserve topological invariants, information $\mathfrak{s}$ is preserved: for $\mathcal{D}'=\mathfrak{d}$ ($\mathcal{D}$), $\mathfrak{s}$ ($\mathcal{D}'$) $\mathfrak{s}$ ($\mathcal{D}$). The set of all such transformations has the structure of a group, $\mathcal{G}$.

This entire scheme can be implemented in simplicial form; $\mathcal{G}$ is finite, finitely presented, discrete.

The twofold object of the presently described invention is to provide a new and novel procedure to perform arbitrary (in the potential applications privacy-preserving) data analytics, as well as a process to detect whether a given message coded in $\mathcal{D}$ is 'true' or 'false' or yet 'undecidable' with respect to a given reference library $\mathcal{L}$.

The method herein describe has two primary parts. With the first one, Methods and Systems for Highly Secure Data Analytic Encryption (or ENCRIPT), the outcome of a data analytics manipulation over a (large but not necessarily) set of proprietary data is such that only the data owner—if enabled to perform its specific steps within the encryption/decryption procedure that ENCRIPT provides—can read the output with the right attribution of ownership.

Input data, assumed to have homogenous representation, require a preparation process which can be summarized in the following way:

$\Delta \equiv$ [Raw Data] $\mapsto$ [Simplicial Complex] $\mapsto$ {Persistent Homology Analysis} $\mapsto$ (Persistent 'proximity' Parameter $\mathcal{G}$ ) $\mapsto$ [Working Data] $\equiv \Delta_{in}^{(PH)}$.

Out of $\Delta_{in}^{(PH)}$ in standard way one constructs the entire relevant invariant (persistent) homology scheme. Typically, the space of data $\mathcal{D}$ is orientable: as such it can be thought of as homotopic to a CW complex, but the process is not limited to this choice. The steps leading from [Raw Data] to [Working Data] are characteristic of Topological Data Analysis (TDA).

A typical data manipulation scheme is represented in ENCRIPT as $$\Delta_{in}^{(PH)} \xrightarrow{h} \Delta^{(t)} \xrightarrow{\phi} \Delta^{(m)},$$

where $h$ is a generic fully homeomorphic encryption process (FHE; commercially available); $\phi \in \text{Homeo}(\mathcal{D})$ is an operation of the group $\mathcal{G}$ of transformations of data space $\mathcal{D}$ into itself that preserve topology. $\mathcal{G}$ is the discrete (because $\mathcal{D}$, thought of as a simplicial complex is discrete) analog of the mapping class group for a continuous space.

$$\Delta^{(t)} = h\left(\Delta_{in}^{(PH)}\right)$$

is the conventionally encrypted working data set; $\Delta^{(m)} = \phi(\Delta^{(t)})$ is the set of data on which the data analytics manipulation, $\mathcal{A}^{(\mathcal{A})}$, is performed. FHE is a form of encryption that allows us to perform manipulations on its encrypted data without first decrypting it.

Let $\mathcal{A}^{(\mathcal{A})}(\Delta^{(m)}) \equiv \Delta^{(o)}$, $\mathcal{A}^{(\mathcal{A})}(\Delta)$ being the process of: extraction of information $\mathfrak{I} \approx \{s(\mathcal{D})\}$ (the set of all correlation/causation patterns of data space $\mathcal{D}$), followed by extraction of knowledge $\mathfrak{K} \approx \{\mathfrak{I}\}$ (the set of all correlation/causation patterns of correlations) implemented by data analytics. The global outcome of the process under consideration is then:

$$\Delta_{out}^{(PH)} = h^{-1}(\phi^{-1}(\Delta^{(o)}))$$

The task required is constructing a set $\mathfrak{S}$ containing one representative element of the group actions for each of the equivalence classes that $\mathcal{G} \sim \text{Homeo}(\mathcal{D})$ implies.

This requires computing first the simplicial homology module with coefficients in $\mathbb{Z}$ of $\mathcal{D}$, which is standard. A procedure for computing the simplicial homology module with coefficients in $\mathbb{Z}$ of a space $\mathcal{D}$ is available, based on single-step recursive homology preserving reduction of the size of the associated chain complex. The process' outcome is the explicit matrix representation of the homology generators $\{\Gamma_j^{(n)} | 0 \leq n \leq N; j \in \mathbb{N}\}$ for all $H_n$'s. Here, typically, $0 \leq j \leq J$, where $J \leq \mathcal{N}_c$, $\mathcal{N}_c$ being the number of n-cells in $\mathcal{D}$ considered as a CW complex.

Then, the task is computationally hard but can be accomplished resorting to two basic steps: (1) Factorization: decompose $\mathcal{D}$ in elementary components $\mathcal{D}_K$, generated by the set of relevant homology groups $\{H_n | n=1, \ldots, N\}$ of $\mathcal{D}$ as emerged by the 'persistent homology' analysis. The construction is straightforward for $N \leq 3$; it is more complex—and might pose problems in terms of algorithmic complexity—for $N \geq 4$, in which case one should resort to homotopy rather than homology analysis, certainly more demanding. It is an empirically checked fact that in the very large number of data sets examined over the years, data coming from a great variety of domains, $N \geq 4$ was never found.

(2) Orbifold: identify such components $\mathcal{D}_K$ with the foliation of all possible local coverings of $\mathcal{D}$ with orbits generated by the local symmetry group. This can be done using local GL(n) algebra for composition operations.

Since FHE $h$—assumed to decouple the name of the owner from data in standard way—and the construction of $\mathfrak{S}$ do not commute, and $\phi$ is any word (string of generators, possibly with repetitions) in $\mathcal{G}$, the output $\Delta_{out}^{(PH)}$, final outcome of the data manipulation with the proprietors' names reattached, is accessible only to the data owner herself in an absolutely secure way. Indeed, the owner selects, case by case, both the operation $\phi$, and the encryption $h$ (possibly outsourced).

Information accuracy depends on the maximum homological dimension $n_{max}$: the dimension at which persistent homology analysis allows us to stop. Knowledge completeness and accuracy depend only on homological dimension $N \approx n_{max}$.

Turning now to the presently described Method and System for Detection and Extraction of Truthful Content (or TRUTH), operating on a (large, but not necessarily so) set of raw homogeneous data, which are assumed to encode a specific piece of information that we refer to as a Message, m, a process $\wp$ is made available whose outcome is a statement on whether m is 'true' or 'false' or yet 'undecidable'.

The logical framework for reasoning about knowledge and evidence, objective of $\wp$, is assumed to be itself uncertain about how to interpret evidence. This is done by representing evidential states not as fixed subsets of the state space, but allowing for the set of possible pieces of evidence they may correspond to vary over diverse choices belonging to a specific equivalence class $\varepsilon \in \mathfrak{L}$, and therefore be itself the subject of uncertainty. Such structure is a generalization of the notion of topological spaces.

A faithful, robust, complete axiomatization of the corresponding tri-modal logic of knowledge and evidence entailment exists; in TRUTH it is extended to include two new modalities: i) the belief modality and its interaction with evidence interpretation and entailment, ii) the "knowability" modality, implemented by an interior operator.

In the frame of doxastic logic, resorting to a topological semantics for evidence, evidence-based belief, knowledge, learning, generalizes evidence models for belief and doxastic epistemic. Such logic is complete, decidable and allows for a finite model. The structure of topological subset spaces (connected with equivalence classes) is what allows for a natural distinction between what is known and what is knowable, provided one resorts to the tri-modal logic of knowledge, knowability, and belief.

As already used in the realization of ENCRIPT, topological subset spaces, $\mathcal{D}_K$, in which belief is definable in terms of knowledge and knowability, provide the natural tool to interpret the space of data as a (compact) orbifold and define a specific homology theory for compact orbifolds: the stratified simplicial homology, associated with the specific simplex-generating triangulations. The orders of the local groups of the points of the orbifold are encoded in the boundary map, hence the theory naturally captures all the necessary structural information of the orbifold.

Incidentally, stratified simplicial homology is invariant under homotopy equivalences that preserve the orders of local groups in all strata. In this perspective, the free part of the homology coincides with the customary simplicial homology of the orbifold and its singular sets. It is then the torsion part that possibly encodes new information. In general, torsion depends in nonlinear way on the local groups of the singular points, and fully bears on the correlation of the singular points in the orbifold.

In TRUTH, data in input must preliminarily undergo a preparation process:

$\Delta \equiv [\text{Raw Data}] \Rightarrow [\text{Simplicial Complex (Hypergraph)}] \mapsto \{\text{Persistent Homology Analysis}\} \mapsto (\text{Persistent 'proximity' Parameter } \eta_{\mathcal{G}}) \mapsto [\text{Working Data}] \equiv \Delta_{in}^{(PH)}$. Resorting to ENCRIPT one can obtain, out of the data set $\Delta_{in}^{(PH)}$ for the discrete space (simplicial complex) $\mathcal{D}$, the full persistent homology groups scheme $\mathfrak{H} = \{H_n | 0 \leq n \leq N\}$, with the whole set of their generators $\{\Gamma_j^{(n)} | 0 \leq n \leq N; 0 \leq j \leq \mathcal{N}_c\}$. Defining representatives of the equivalence classes induced by $\mathcal{G}$ in its orbifold faithful realization, is natural in the basis provided by the $\Gamma_j^{(n)}$'s. The outcome is that data in the set $\Delta_{in}^{(PH)}$ are naturally and neatly organized in topological equivalence classes, $\{c_i\}$, subsets invariant under $\mathcal{G}(\mathcal{D})$, fully characterized by $\mathfrak{H}$ and by the representations of group $\mathcal{G}$ (locally~GL(n, $\mathbb{Z}$)). Denote such subsets by $\mathcal{D}^{(c_i)} \sim \{\mathcal{D}^{(c_i)} | 1 \leq n \leq N, i \in \mathbb{N}\}$.

The process $\wp$ implemented by TRUTH can be described in this way: given the area of knowledge $\mathcal{A}$ of $\mathfrak{L}$, and the news $\mho$ belonging to it, one constructs the 'reference frame' that defines the 'confidence area' $\mathcal{C} \subseteq \mathcal{A}$ over $\mathcal{D}$ for $\mho$, namely the subset $\mathcal{T} \subset \mathcal{D}$ whose elements are true in $\mathcal{A}$.

Evolve $\mho$ and $\mathcal{T}$ through the acquisition of their sibling trajectories $\{\tau_i\}$ in $\mathcal{D}$ (news about news, about news, . . . ), and fully characterize $\{c_i\} \forall \{\tau_i^{(n)}\}$, up to a chosen maximum iteration number N.

If $\forall i$, $U_{n=1}^{N}\tau_i^{(n)}(\mho) \cap U_{n=1}^{N}\tau_i^{(n)}(\mathcal{T}) \subseteq U_{n=1}^{N}\tau_i^{(n)}(\mho)$, then $\mho$ is true, otherwise $\mho$ is false.

In other words, if the $\tau(\mho)$ orbit—expressed in terms of the generators of $\mathcal{G}$ or more precisely now, of the orbifold foliation generators—is not contained in $\tau(\mathcal{T})$, this indicates that some (malicious) manipulation of truth has taken place there.

As described, data in input must preliminarily undergo a preparation process:

$\Delta \equiv$ [Raw Data] $\Rightarrow$ [Simplicial Complex (Hypergraph)] $\mapsto$ {Persistent Homology Analysis} $\mapsto$ (Persistent 'proximity' Parameter $\mathcal{G}$) $\mapsto$ [Working Data] $\equiv \Delta_{in}^{(PH)}$.

Resorting to the encryption process of generating a set of transformations of the space of data into itself that preserves topology (the 'shape' of the space) one can obtain, out of the data set $\Delta_{in}^{(PH)}$ for the discrete space (in fact a simplicial complex) $\mathcal{D}$, the full persistent homology groups scheme $\mathfrak{H} = \{H_n | 0 \leq n \leq N\}$, with the whole set of their generators $\{\Gamma_j^{(n)} | 0 \leq n \leq N; 0 \leq j \leq \mathcal{N}_c\}$. Defining representatives of the equivalence classes induced by Homeo($\mathcal{D}$) in its orbifold faithful realization, is natural in the basis provided by the $\Gamma_j^{(n)}$'s. The outcome of this is that data in the set are thus naturally and neatly organized in topological equivalence classes, $\{c_i\}$, subsets individually invariant under Homeo$_0$ ($\mathcal{D}$), characterized by $\mathfrak{H}$ and by the representations of group G (locally GL(n, $\mathbb{Z}$)). Denote such subsets by $$\mathcal{D}^{(c_i)} \sim \{\mathcal{D}_n^{(c_i)} | 1 \leq n \leq N, i \in \mathbb{N}\}$$

The process $\wp$ performed according to an embodiment of the present invention can be described in this way: given the area of knowledge $\mathcal{A}$ and the news $\mho$ that belongs to it, one constructs a 'reference frame' that defines the 'confidence area' $\mathcal{C} \subseteq \mathcal{A}$ over $\mathcal{D}$ for that news, namely a subset $\mathcal{T} \subset \mathcal{D}$ whose elements are true in $\mathcal{A}$.

Evolve $\mho$ and $\mathcal{T}$ through the acquisition of their sibling trajectories $\{\tau_i\}$ in $\mathcal{D}$ (news about news, about news, . . . ), and fully characterize $\{c_i\}$ for all $\{\tau_i^{(n)}\}$, up to maximum dimension N.

If $\forall i$, $U_{n=1}^{N}\tau_i^{(n)}(\mho) \cap U_{n=1}^{N}\tau_i^{(n)}(\mathcal{T}) \subseteq U_{n=1}^{N}\tau_i^{(n)}(\mho)$, then $\mho$ is true, otherwise $\mho$ is false.

In other words, if the $\tau(\mho)$ orbit—expressed in terms of the generators of $\mathcal{G}$ or rather, in this scheme, of the orbifold foliation generators—is not contained in $\tau(\mathcal{T})$, this is considered an indicator of malicious manipulation of truth.

Topology and geometry typically provide the connective tissue that enables logical comprehension. The most relevant part of which is Recursive Distinctioning (RD).

Topology and geometry typically provide the connective tissue that enables logical comprehension. The most relevant part of which is Recursive Distinctioning (RD). Recursive Distinctioning (a neologism coined by Lou Kauffman) aiming to disambiguate the notion of "distinguishing" from that of "making distinctions") is actually a self-definitory name. A pattern of distinctions is given in a base space; usually mimicked for example on a graphical structure, such as a line of print or a planar lattice or given graph, or—finally—a simplicial complex, $\mathcal{S}$. Each node of such "ambient structure" is occupied by a letter, selected in some (arbitrary) alphabet. A specialized alphabet is given that can indicate distinctions about "neighbors"—in the appropriate topology—of a given node. The neighbors of a node are all nodes that are connected to that node by simplices in $\mathcal{S}$. The letters in the specialized alphabet, say SA, are used to describe the states of the letters in $\mathcal{S}$ and at each stage in the recursion, letters in SA are written at all nodes in $\mathcal{S}$, "describing" its previous state. The recursive structure that results from the iteration of descriptions is what we refer to as Recursive Distinctioning.

Elementary RD patterns are basic building blocks found in most structures at all levels. For example, an RD Replicator can be defined, which works—assuming the phenomenon of the simple and the complex to be generic for all systems—by finding a point of simplicity that makes the evolution possible of understandings that are otherwise impossible to obtain.

The basic idea of RD can be thought of in natural way within the context of cellular automata, but RD is distinct—though it embodies it—from a cellular automaton scheme in that its basic recursion depends on direct distinctions made (locally) in relation to distinctions present in the actual global state of the automaton. The latter are not necessarily at the letter-level but can be (and typically are) at higher-order. Moreover, the operation of distinction can be shifted to higher levels than the mere question of sameness or difference for nearby iconic elements of the state; rules that involve direct matters of sameness or difference. In other words, such RD rules are very primitive rules, but their complexity can be arbitrarily increased, going to higher and higher and more refined topological structures. In data space, $\mathcal{D}$, this is done by operations of the group of homeomorphisms.

The role of the concept of distinction and the making of distinctions is fundamental in both theory and practice: every moment of using a digital computer depends upon the myriad of distinctions that are handled automatically by the machine, enabling the production and recording of words and the computation and transmission of information: Distinctions that act on other distinctions.

Once a new distinction is born, it turns into the object of further action. Very simple distinctions of equality, for example, right/left, that upon allowing them to act on themselves produce periodic and dialectical patterns, entail the existence of higher-level phenomena. With the example in mind of what this scheme implied generating from itself—as it was done—all the industry of computation that emerges from the idea and the implementation of Turing machine symbol manipulation rules, one can construct models on the nature of "intelligence" of what is true versus what is fake.

The relative exiguity of the toll and the simplicity of the mathematical structure versus the enormous complexity of the behaviors that can arise and be detected are quite remarkable. Each string in the recursion can be regarded as describing its predecessor; a feature, the very existence of such intricate structure in the process of description, unexpected in itself. There follows that "description" is just another word for "making a distinction". The description of a given (multi-dimensional) string is a string of individual distinctions that have been made, whereas each individual distinction is one which recognizes whether, e.g., a given character in a string is equal to one of its neighbors; to a fraction of them or to none. Such elementary distinction becomes instantiated as a character in the new description string. The description string can be subjected to the same sort of scrutiny and so the recursive process continues.

Note that such recursive process depends, at its base, on the most elementary distinctions possible for character strings; no mathematical calculations are needed, nor performed. This is why it is particularly well suited to deal with objects characterized by the (topological) equivalence class they belong to.

Main pillar of the topological approach to data analytics is the notion of data space, the crucial feature of which is that it is neither a metric space nor a vector space, but is a topological space. Fundamental goal of it is to overcome the conventional method of simply converting the collection of points in data space into a combinatorial graph $\mathcal{G}$, an object encompassing all relevant local topological features, whose edges are determined by some given notion of proximity, characterized by a parameter $\eta$ somehow fixing a coordinate-free metric. Indeed, while $\mathcal{G}$—if considered as a network—captures pretty well local connectivity data, it ignores an abundance of higher order features, most of which have global nature. Such features are instead accurately captured by focusing on a different object than $\mathcal{G}$, $\mathcal{S}$. $\mathcal{S}$ is the higher-dimensional, discrete object, of which $\mathcal{G}$ is the 1-skeleton, generated by combinatorially completing the graph $\mathcal{G}$ to a simplicial complex. As such, $\mathcal{S}$ is built from higher and higher dimensional simple pieces (simplices) identified (combinatorially) along their faces. This makes the subtle features of the data set, seen as a topological space $\mathfrak{X} \sim \mathcal{S}$, manifest and accessible. In this representation $\mathfrak{X}$ has a hypergraph structure whose hyperedges generate, for a given $\eta$, the set of relations induced by $\eta$ itself as a measure of proximity. In other words, each hyperedge is a relational simplex, i.e., a simplicial complex built by gluing together lower-dimensional relational simplices that satisfy the $\eta$ property. This makes effectively metric independent: in fact, an n-relation here is nothing but a subset of n related data points satisfying the property represented by $\eta$. Key ingredients of the analysis become then the homology groups, $H_j(\mathfrak{X})$, $j=0, 1, \ldots$ of $\mathfrak{X}$ and in particular the associated Betti numbers, a basic set of topological invariants of the j-th Betti number, $b_j = b_j(\mathfrak{X})$, being the rank of $H_j(\mathfrak{X})$. Persistent homology is generated recursively, beginning with a specific complex characterized by a given $\eta = \eta_0$ and constructing from it the succession of chain complexes and chain maps for an increasing sequence of values of $\eta$, say $\eta_0 \leq \eta \leq \eta_0 + \lambda$, for some $\lambda$. Complexes grow with $\eta$, thus such chain maps can be naturally identified with a sequence of successive inclusions. Besides the customary filtrations due to Vietoris-Rips, whose k-simplices are the unordered (k+1)-tuples of points pairwise within distance $\eta$, and Čech, where k-simplices are instead unordered (k+1)-tuples of points whose $$\frac{1}{2}\eta$$

ball neighborhoods intersect, in the case of simplicial complexes that are manifolds, Morse filtration by excursion sets is relevant. Even though apparently dealing with metric-dependent features, Morse filtration is indeed purely topological, and the Morse complex it generates allows encoding the same information as Betti numbers encode, yet it allows us to think of an underlying manifold. A single mathematical object may be assumed to encompass most of the information about the global topological structure of the data space: $\mathcal{P}(z)$, the Hilbert-Poincaré series (indeed a polynomial, in some indeterminate z); generating function for the Betti numbers of the related simplicial complex. $\mathcal{P}(z) = \Sigma_{j \geq 0} b_j z^j$, can be generated through a gauge field theory, as it turns out to be nothing but one of the functors of the theory itself for an appropriate choice of the field action. The arena for a 'Topological Data Field Theory' (TDFT) is a topological gauge theory for the space of data $\mathfrak{X}$. On it (or rather on $\mathcal{S}$) gauge theory for the space of data $\mathfrak{X}$. On it (or rather on $\mathcal{S}$) vector bundles can be constructed, proper to the PL category, which allow us to reduce geometric and transformation problems over manifolds to homotopy theory for the various groups and complexes involved. This provides a natural way to reconstruct the moduli space of G-bundles—G being the 'gauge' group—in a discretized setting extended to a simplicial complex. In spite of its topological complexity, data space offers a natural, simple choice for the action. Indeed, the 'kinetic' part of the action is nothing but the simplicial complex intrinsic (metric-free) combinatorial Laplacian. As for the group G, the space of data has the far-reaching property of being fully characterized only by its topological properties, thus there is only one natural symmetry it needs to satisfy: invariance under all those transformations of data that don't change its topology and are consistent with the constraints. This implies that the gauge group G can be assumed to be the semidirect product $G_p \ltimes G_{MC}$ of the group $G_p$ associated with the characteristic 'process algebra' of the data set and the simplicial analog $G_{MC}$ of the mapping class group for the space of data. Features and construction of $G_{MC}$ are thoroughly discussed in co-pending application Ser. No. 17/693,077. The significant role here played by $G_p$.

The steps that follow provide the description of the steps aimed to construct the system of constraints fully defining the process algebra $G_p$ in such a way that data processing implements the classification of the orbifold equivalence class consistently with the definition and criteria of truth adopted.

The relevant question concerns those distinctions that can be made automatic. Contrary to what is done with, e.g., cellular automata, TDFT can be designed so as not to replace according to a (arbitrary) rule, but to place a character that describes the distinctive structure of the neighborhood of the predecessor character according to a strategy of its own. In other words, the field is itself a sort of meta-automaton that engages in a meta-dialogue about itself (more precisely, its own structure). The patterns produced by recursive distinction are in this way recognized as parts of a dialogue that the strings hold with themselves. Being the reference space a symmetric space, the natural language for such dialogue is provided by the full set of generators and relations of the gauge group of the TDFT over $\mathfrak{D}$. Turing universality can be demonstrated also for processes of this type, but what is unexpectedly far reaching is that the paradigm of recursive distinctioning goes beyond that of the Turing machine.

Another, still higher, level is that structures of this sort may examine with the aid of human-like eyes and minds of AI machines the output of the field evolution and find patterns in the entire ensemble of strings, thus engaging in further design. This is where the recursive automatic distinctions meet the aware distinguishing of the observers of the system, connecting the automatic process with the awareness process and the design level.

In the design of computing machines human beings have always confronted the issue of repeatability for the sake of computation or for the sake of the production of pattern (as in weaving) or the reliability of manufacture (as in timekeeping). This implies that elementary distinctions must be reproducible and comparable. Automatic distinctions refer to highly repeatable situations that can be regarded as reproductions of distinctions that are available to an observer. In some cases, such distinctions are engineered into the device; in other cases, computational and reproducible patterns can be recognized in natural situations. We do not restrict ourselves in the use of the word distinction to whether the distinction is meant as a distinction made by a machine or by some human observer; actually, we refer as well to distinctions that are ongoing in a device beyond our direct observation. Nevertheless, the process necessarily stops at a human-like observer who recognizes the patterns and is able to interpret the meaning of what has been produced.

The characteristic tool of the topological approach is weighted graph (indeed, simplicial complex) persistent homology. The added value of this method over conventional network techniques lies in its capability to describe mesoscopic structures within the system that coexist over different spatial and intensity scales, and this makes it a good candidate for describing patterns with the structure of functional networks. Moreover, this approach uses the whole information available, without any ad-hoc filtering. Standard simplicial homology details the multidimensional hole structure of a topological space, and because topological information is independent of the metric properties of the space it provides a robust indicator in noisy or incomplete datasets.

The approach outlined rests on an interpretation of cognition as it may be defined in terms of category theory. Compact closed categories are complete with regard to any sort of higher order language (for brevity 'calculus') used to depict and reason, e.g., about information flows. Such calculus reveals the multi-linear algebraic level needed to prove information protocols and simplifies the reasoning thereof to a great extent, yet only locally, due to the underlying additive local vector space structure (a sort of tangent space).

In this perspective, protocols as well as data flows can be modeled using bi-products defined over a compact closed category. Not any calculus can be extended well to bi-products, and not any categorical axiomatization may be as clear as the built-in monoidal tensor of the category. Here Frobenius algebras prove useful. The operations of such algebras correspond to a uniform copying and deleting of a given basis (in our framework this could be provided by the (irreducible) representations of G($\mathcal{D}$), G denoting the gauge group of the TDFT.

Yet another issue is the notion of cognition. It resorts to concepts and methods emerging from the idea of "state" and "probability of a state", thus it is a particularly useful and promising framework to describe a variety of seemingly irrational judgments and decision-making findings, providing—as it does—a new perspective for cognitive operations. The critical assumption is that human reasoning—in a wide range of situations relevant, for example, to approach bounded-rationality—obeys such laws, taking into account a myriad of puzzling effects like conjunction fallacies, disjunction fallacies, averaging effects, unpacking effects, and order effects, violations of sure-thing principle in decision theory, violations of symmetry in similarity judgment, producing new predictions.

A model clearly distinguishing between subjective and objective probabilities is necessary, focusing on the concept of subjective knowledge. Once more it is the categorical approach that allows us to define cognitive models based on composite systems, suggesting a procedural description of cognitive processes in terms of algorithms, and a cognitive interpretation of the system state. However, predictions rely on models which involve virtual objects that display non-local properties.

The set of rules necessary for a novel reliable cognition model, a knowledge-based model of cognition, vs. the usual decision models that give predictions about different things—the former about the knowledge of uncertain events (mainly judgments and indirectly choices); the latter only about decisions—is: 1) the subjects' cognitive representation is given by a set of points (a cloud) in a multidimensional space; technically, a PL topological space similar to the data space. The architecture of the information dealt with determines the representation, resorting to the minimum possible amount of cognitive resources; 2) specific knowledge about a verifiable event is represented by a sub-space of such state space and requires a specific projection operator. The corresponding subspace does not correspond to an event, but to the certain knowledge of an event. The decision model in this case may contain an ambiguity about the concept of event that can lead to the necessity of operating a disambiguation procedure; 3) the judged probability Pr (e) that an event e is true (or 1−Pr(e) that it is false) equals the measure of the projection of the corresponding set in state space onto the subspace representing the certain knowledge of the event. This rule removes the notion of answer to a question, working only with the knowledge of the event and its degree of knowledge. Two points are important: this new process is unable to make predictions about the probability that given subjects furnish a particular answer; it works only with judged probabilities; 4) the updated cognitive state after a subject knows with certainty that an event is true equals the normalized projection on the subspace representing that event; 5) if no new information is provided, the subject's cognitive state evolves in time as a free state. The free evolution of cognitive states (namely, evolution without any answers, judgments, new information) is trivial, as it is reversible, as opposed, e.g., to the addition of new information.

Languages are indeed the natural support of a meaningful notion distance. The collection of all languages over a given (finite) set of symbols forms a semiring, that can be thought of as 'a language space'. Families of languages are defined by interrelations among words. The traditional classification emerges from the syntax rules and/or grammar of the language, that is, the word-transformations through which the entire language can be generated from a single axiom, or starting word. The concept of distance between languages meant as objects, and the notion of which topologies are induced by language distances on language spaces play a central role. Conventional language distances are known to introduce topologically awkward features into a language space, such as, e.g., complete disconnectedness. Related questions concern the constraints that language distance and the topology it is consistent with may have on the notion of a random language.

An appropriate gauging of the language distance is indeed necessary. Non-metric pseudo-metrics are assumed as possible language distance functions, which may be approximated by metric quotient spaces. The study of the notion of randomness implied by the topology induced by such a pseudo-metric on a language space provides insight into the structure of language spaces and verifies the viability of the pseudo-metric.

Three language pseudo-metrics are well studied: Cantor word metric, most commonly used; the upper-density Besicovitch pseudo-metric, natural when dealing with cellular automata; and a specific normalized topological entropy. Each of them is evaluated on the symmetric set-difference between languages. All these distances induce a specific distinct topology on the space of languages. The topology induced by Cantor distance is compact and totally disconnected, the topologies induced by the other two are non-compact, with entropic distance resulting in a topology that is essentially the strict refinement of the Besicovitch topology. None of the three topologies, however, gives quantitative expression to the distinction between regular and linear languages, although Martin-Löf's randomness tests show that each of these pseudo-metrics is associated with a different notion of random language.

On the other hand, classification of language mappings has been defined, aiming to identify those maps which best preserve the structure of a languages under specific topological constraints. Results regarding mapping continuity, the matrix representation of the related morphisms pre-images, and the formal expressions of the probability distribution of the morphisms images are known. The continuity of an injective language morphism on its image has been proved as well.

All of this is relevant to understand that syntactic and algebraic topological continuations of this approach are natural in the context of TDFT.

Formal language theory originates with the search for patterns in sequences, and the classification of grammars Its initial purpose was to classify and characterize languages as mathematical objects; each language meant as one of uncountably many members of a countable collection of semirings. A language belonging to one of the ensuing classical hierarchy of families is recognized by a grammar/syntax, or by an equivalent logical machine. Simpler syntactic relations typify sub-families of languages. Still other collections of languages are identified by their algebraic structure, while other families of languages are characterized by operations, such as morphisms of words or splicing rules. A new classification of languages can in principle be achieved by correctly equipping the language space with an intrinsic (i.e., metric free) topology, and this depends on accurately gauging the distance-like relationship between its elements: topology is a vital issue in any application of language theory to complex systems.

The machinery necessary for the investigation of the language space topology, all naturally incorporated in the TDFT-CT-IT scheme is manifold: i) Symbolic Dynamics: a language and the relations within it are viewed as the product of the inherent operation of a dynamical system. Here, as mentioned, the three metrics typically employed are: the metric on bi-infinite sequences, which can be transformed into a language metric, the Cantor distance; the "Besicovitch pseudo-metric", still a metric on the bi-infinite sequences designed to make up the elements of the configuration space of generalized discrete-time automata; topological entropy. ii) Formal Language Theory & Information Theory: several instances of language pseudo-metrics can be selected, on which a language topology might be tested to characterize pseudo-metrically, rather than syntactically, language families. The validity of a language topology hinges ultimately on the capacity to detect whether a given distance and topology obscures or enhances the relative amount of information expressible in a given language, namely to establish the complexity of the languages change induced by a change in topology.

As for classes of language mappings, a natural isomorphism between language spaces exists only when the spaces are in all essential respects topologically equivalent. This bears on morphisms and language distribution under morphisms, which allow us to classify languages and determine their complexity without prior knowledge of their syntax. The dynamics of languages depends on the topology, due to the relationship between topology and the behavior of language transformations. This relates topology, morphisms and randomness of the space of formal languages, hence is a gateway to the comprehension of any process that may be modeled as the operation of a discrete-time dynamical system.

FIG. 1 depicts a block diagram of an embodiment of a computer-implemented system 10, hereinafter called "the system" for performing methods for highly secure data analytic encryption and detection and extraction of truthful content, according to the present disclosure. System 10 includes an artificial intelligence engine 11 for generate topologies of data structures as described herein to recommend treatment plans and/or provide excluded treatment plans that should not be recommended to a patient.

System 10 also includes a server 30 configured to store and to provide data to be analyzed from one or more data sources 15. Data source 15 communicates with one or more networks 34 and 58 to receive and store data. In one embodiment, data from data source includes an individuals personal confidential information, but numerous types of data containing sensitive information are contemplated. Server 30 may include one or more computers and may take the form of a distributed and/or virtualized computer or computers. Server 30 also includes a first communication interface 32 configured to communicate with an owner's interface 94 via a first network 34. In some embodiments, the first network 34 may include wired and/or wireless network connections such as Bluetooth, ZigBee, Near-Field Communications (NFC), cellular data network, etc. Server 30 includes a first processor 36 and a first machine-readable storage memory 38, which may be called a "memory" for short, holding machine readable instructions 40 for performing the various actions of server 30 for execution by the first processor 36. Server 30 is configured to store data under analysis by the herein described techniques for highly secure data analytic encryption and detection and extraction of truthful content. For example, the memory 38 includes a system data store 42 configured to hold system data, such as rule or formulae and instructions for defining a set of data as a topological space, generating a collection of topological invariants according to at least one characteristic of the topological space; assigning a shape to the topological space according to the generated collection of topological invariants; decomposing the topological space into subcomponents according to a set of homology groups; decoupling from the defined topological space identity data of an authorized owner of the data proprietary information defined as the topological space according to a data encryption manipulation process performed on the data without decryption of the data; and generating an output according to the recoupling of the identity data of the authorized owner used to recouple the defined topological space according the data encryption manipulation process, wherein the recoupling the topological space requires recoupling of the decoupled identify data according to a recoupling procedure performed by the authorized owner. Any of the data stored in the system data store 42 may be accessed by an artificial intelligence engine 11 when performing any of the techniques described herein.

Server 30 in an embodiment is also includes a veracity item data store 44 configured to hold data, such as news items or social media posts, the veracity of which will be analyzed by the system.

In some embodiments, the server 30 may execute an artificial intelligence (AI) engine 11 that uses one or more machine learning models 13 to perform at least one of the embodiments disclosed herein according to the various rules and formulae described herein, Server 30 may include training engine 9 capable of generating the one or more machine learning models 13. Machine learning models 13 may be trained to assign a particular topology to a set of data according to the data set's characteristics, generating a collection of topological invariants according to at least one characteristic of the topological space; assigning a shape to the topological space according to the generated collection of topological invariants; decomposing the topological space into subcomponents according to a set of homology groups; decoupling from the defined topological space identity data of an authorized owner of the data proprietary information defined as the topological space according to a data encryption manipulation process performed on the data without decryption of the data; and generating an output according to the recoupling of the identity data of the authorized owner used to recouple the defined topological space according the data encryption manipulation process. One or more machine learning models 13 may be generated by training engine 9 and may be implemented in computer instructions executable by one or more processing devices of the training engine 9 and/or the servers 30. To generate the one or more machine learning models 13, training engine 9 may train the one or more machine learning models 13. The one or more machine learning models 13 may be used by the artificial intelligence engine 11.

Training engine 9 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 9 may be cloud-based or a real-time software platform, and it may include privacy software or protocols, and/or security software or protocols.

The system 10 shown in FIG. 1 also includes an owner's interface 94 that in one embodiment is be configured for use by a person having responsibility for the analyzed data. Owner interface 94 is configured to communicate with server 30 over a first network 34.

Owner interface 94 includes an assistant input device 22 and an assistant display 24, which may be collectively called an assistant user interface 22, 24. Owner input device 22 may include one or more of a telephone, a keyboard, a mouse, a trackpad, or a touch screen, for example. Alternatively or additionally, owner input device 22 may include one or more microphones Owner display 24 may take one or more different forms including, for example, a computer monitor or display screen on a tablet, a smartphone, or a smart watch. The assistant display 24 may include other hardware and/or software components such as projectors, virtual reality capabilities, or augmented reality capabilities, etc. Owner display 24 may incorporate various different visual, audio, or other presentation technologies. For example, owner display 24 may include a non-visual display, such as an audio signal, which may include spoken language and/or other sounds such as tones, chimes, melodies, and/or compositions, which may signal different conditions and/or directions. Owner display 24 may comprise one or more different display screens presenting various data and/or interfaces or controls for use by the owner. Owner display 24 may include graphics, which may be presented by a web-based interface and/or by a computer program or application.

Figure 2:
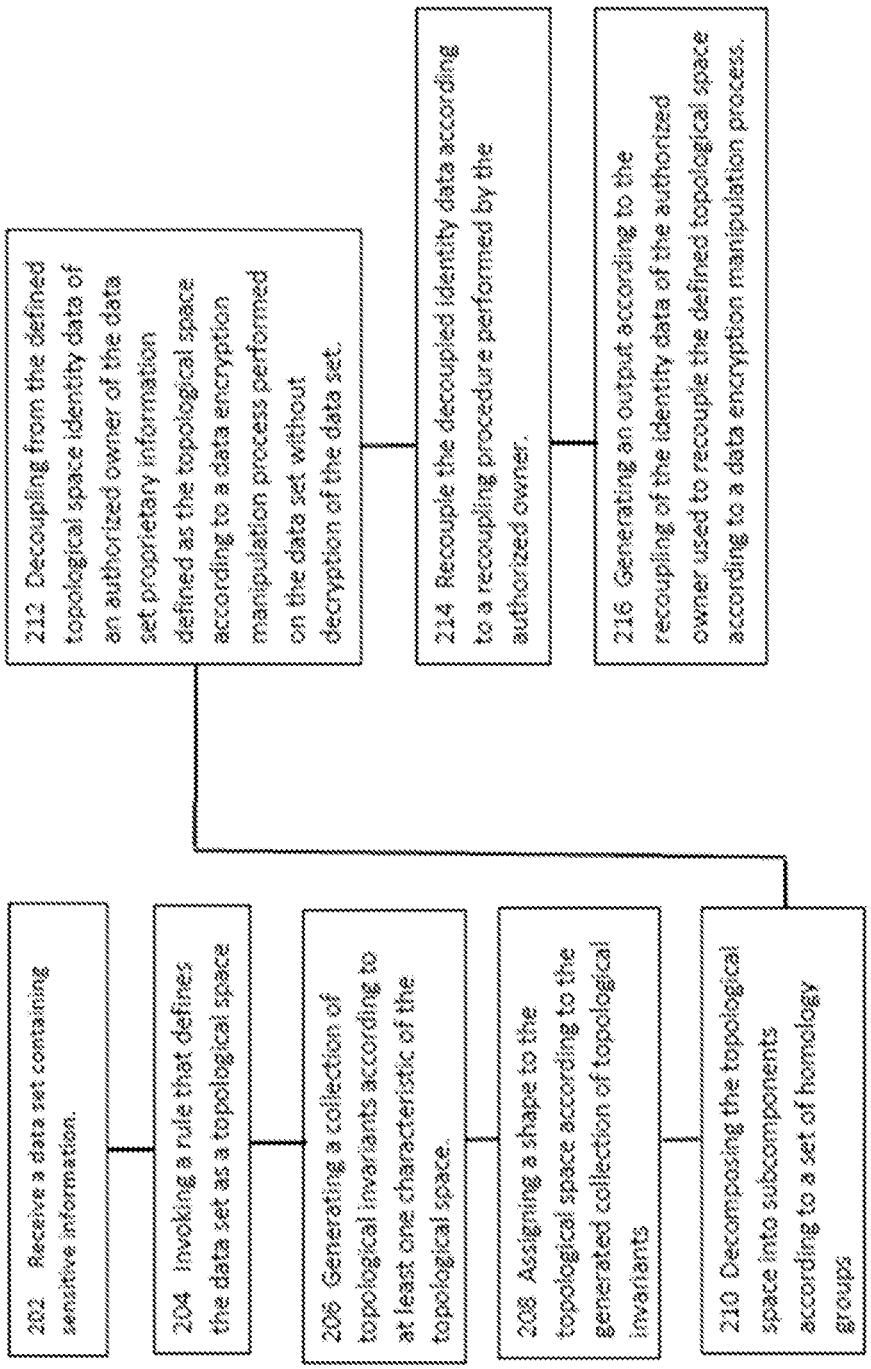
FIG. 2 is a flow diagram of a method performed by a computer implemented system for performing methods for highly secure data analytic encryption and detection and extraction of truthful content, according to an embodiment of the present disclosure.

FIG. 2 is a flow diagram of a method performed by a computer implemented system for performing methods for highly secure data analytic encryption according to an embodiment of the present disclosure. The method of FIG. 2 begins at step 202 where the server receives a data set from a user containing sensitive information. The owner of said sensitive information wishes to transmit such information according to the encryption process of the present invention herein described. The method continues at step 204 where the server invokes a set of instructions or Riles that defines the data set as a topological space. Next, at step 206 the server generates a collection of topological invariants according to at least one characteristic of the topological space. Then at step 208, the server assigns a shape to the topological space according to the generated collection of topological invariants.

Continuing at step 210, the server decomposes the topological space into subcomponents according to a set of homology groups. At step 212 the method continues with decoupling from the defined topological space identity data of authorized owner of the data set, proprietary information defined as the topological space according to a data encryption manipulation process performed on the data set without decryption of the data set. Next at step 214 the decoupled identity data is recoupled according to a recoupling procedure performed by the authorized owner, Finally, at step 216 the method concludes with generating an output according to the recoupled identity data of the automated owner used to recouple the defined topological space according to the data encryption process.

Figure 3:
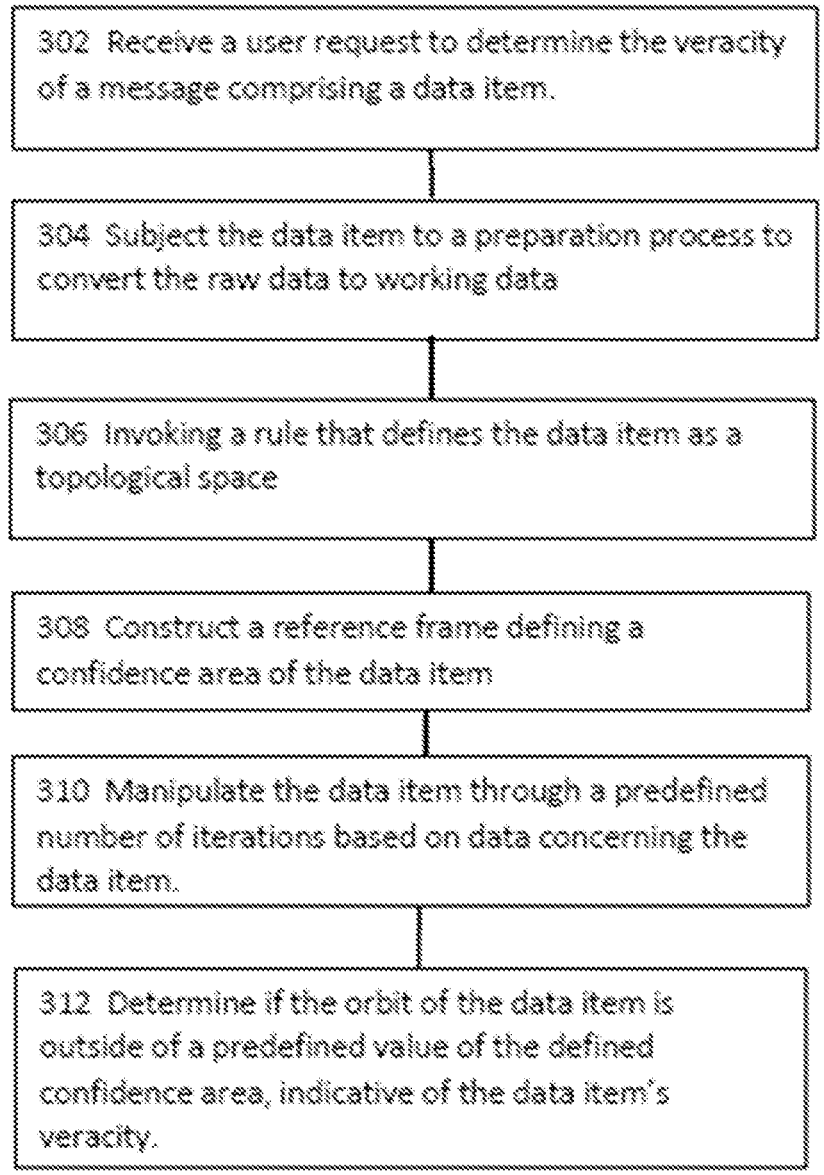
FIG. 3 is a flow diagram of a method performed by a computer implemented system for detection and extraction of truthful content, according to an embodiment of the present disclosure.

FIG. 3 is a flow diagram of a method performed by a computer implemented system for detection and extraction of truthful content, according to an embodiment of the present disclosure. The method of FIG. 3, which in one embodiment are steps performed by a server via execution of executable code embodying the methods herein, starts at step 302 with the server receiving a user request to determine the veracity of a message comprising a data item. Next at step 304, the data item is subjected to a preparation process for converting raw data into working data. At step 306 a rule is invoked that defines the data as a topological space. At step 308 the method continues with the construction of a reference frame defining a confidence area of the data item. At step 310 the data item is manipulated through a predefined number of iterations based on data concerning the data item. At step 312 the method concludes with a determination of whether the orbit of the data, item is outside of a predefined value of the defined confidence area, which is indicative of the data item's veracity. Note that the method of FIG. 3 also leverages the presently described system's encryption-related functionality of defining the data set as a topological space; generating a collection of topological invariants according to at least one characteristic of the topological space; and assigning a shape to the topological space according to the generated collection of topological invariants.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

What is claimed is:

1. A computer implemented system for technological improvement of a data processing systems and encryption of data and secure communication and delivery thereof by transforming an input data set into and undecipherable form which is preserved in encoded form, comprising:
- a server computing device configured to execute an artificial intelligence engine to generate a topological space representative of a data set for encryption of the data set, wherein the server computer device:
  - (a) defines a set of data as a topological space;
  - (b) generates a collection of topological invariants according to at least one characteristic of the topological space;
  - (c) assigns a shape to the topological space according to the generated collection of topological invariants;
  - (d) decomposes the topological space into subcomponents according to a set of homology groups,
  - (e) decouples from the defined topological space identity data of an authorized owner of the data proprietary information defined as the topological space according to a data encryption manipulation process performed on the data without decryption of the data; and
  - (f) generates an output according to the recoupling of the identity data of the authorized owner used to recouple the defined topological space according the data encryption manipulation process,
  - (g) wherein the recoupling the topological space requires recoupling of the decoupled identity data according to a recoupling procedure performed by the authorized owner.

2. The system of claim 1, further comprising the server computer identifies the subcomponents with a foliation of all possible local coverings of the topological space with orbits generated by a local symmetry group.

3. The system of claim 1, wherein the assigning a shape to the topological space according to the generated collection of topological invariants comprises:
- a group Homeo ($\mathcal{F}$) acting on a product manifold $\mathcal{F} \times \mathcal{W}$ for any manifold $\mathcal{W}$, wherein a natural action on $\text{Conf}_k(\mathcal{F}) = (\mathcal{F}^{\times k} - \Delta)/\text{Sym}_n$, wherein $\mathcal{F}^{\times k} = \mathcal{F} \times \cdots \mathcal{F}$, where $k \geq 1$, and wherein $\Delta$ is the topological subspace of n-tuples of points for which at least one pair of components coincide, and wherein the configuration space of k distinct, unlabeled points in $\mathcal{F}$, whereby
- a topological group G acts as a group of homeomorphisms on a space X if each group element induces a homeomorphism of the space in such a way that:

$h \cdot g(x) = h(g(x))$, $\forall g, h \in G$, $\forall x \in X$;

$e(x) = x$, $\forall x \in X$, where e is the identity element of G; and the function $G \times X \mapsto X$ defined by $(g, x) \mapsto g(x)$ is continuous.

* * * * *